(12) United States Patent
Gritter et al.

(10) Patent No.: US 10,564,998 B1
(45) Date of Patent: Feb. 18, 2020

(54) LOAD BALANCING USING PREDICTIVE VM-BASED ANALYTICS

(71) Applicant: Tintri by DDN, Inc., Mountain View, CA (US)

(72) Inventors: Mark G. Gritter, Eagan, MN (US); Satya Vempati, Cupertino, CA (US); Siva Popuri, Mountain View, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 214 days.

(21) Appl. No.: 15/693,244

(22) Filed: Aug. 31, 2017

Related U.S. Application Data

(60) Provisional application No. 62/448,251, filed on Jan. 19, 2017.

(51) Int. Cl.
  *G06F 9/455* (2018.01)
  *G06N 5/04* (2006.01)

(52) U.S. Cl.
  CPC ......... *G06F 9/45558* (2013.01); *G06N 5/04* (2013.01); *G06F 2009/4557* (2013.01); *G06F 2009/45583* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 6,314,465 B1 | 11/2001 | Paul | |
| 9,135,033 B1 | 9/2015 | Lee | |
| 2011/0010514 A1 | 1/2011 | Benhase | |
| 2012/0036327 A1 | 2/2012 | Jennas, II | |
| 2012/0185851 A1 | 7/2012 | Zhang | |
| 2012/0272237 A1 | 10/2012 | Baron | |
| 2013/0097601 A1* | 4/2013 | Podvratnik | G06F 9/5027 718/1 |
| 2013/0238780 A1* | 9/2013 | Devarakonda | G06F 9/5072 709/224 |
| 2014/0250439 A1 | 9/2014 | Parashar | |
| 2016/0070601 A1* | 3/2016 | Yamamoto | G06F 9/5088 718/105 |
| 2016/0070602 A1 | 3/2016 | Shimogawa | |
| 2017/0060611 A1 | 3/2017 | Birkestrand | |
| 2018/0139100 A1* | 5/2018 | Nagpal | H04L 41/12 |

OTHER PUBLICATIONS

Jianhai et al., Affinity-Aware Grouping for Allocation of Virtual Machines, 2013, 2013 IEEE 27th International Conference on Advanced Information Networking and Applications, pp. 235-242 (Year: 2013).

* cited by examiner

*Primary Examiner* — Kenneth Tang
(74) *Attorney, Agent, or Firm* — Van Pelt, Yi & James LLP

(57) ABSTRACT

Load balancing using predictive VM-based analytics is disclosed, including: determining a plurality of storage device specific predicted metric data structures corresponding to respective ones of a plurality of storage devices; and combining the plurality of storage device specific predicted metric data structures corresponding to respective ones of the plurality of storage devices into a combined predicted metric data structure.

20 Claims, 13 Drawing Sheets

| Highest Priority | | | | | | | | | | | | | Lowest Priority |
|---|---|---|---|---|---|---|---|---|---|---|---|---|---|
| 0 | 1 | 2 | 3 | 4 | 5 | 6 | 7 | 8 | 9 | 10 | 11 | 12 | |
| Space usage related Metric 1 | Space usage related Metric 2 | Space usage related Metric 3 | Protection policy violated Metric 4 | QoS related Metric 5 | Access rate related Metric 6 | Access rate related Metric 7 | Load related Metric 8 | Load related Metric 9 | Space usage related Metric 10 | Access rate related Metric 11 | Space usage related Metric 12 | Load related Metric 13 | |

LOAD BALANCING USING PREDICTIVE VM-BASED ANALYTICS

CROSS REFERENCE TO OTHER APPLICATIONS

This application claims priority to U.S. Provisional Patent Application No. 62/448,251 entitled LOAD BALANCING USING PREDICTIVE VM-BASED ANALYTICS filed Jan. 19, 2017 which is incorporated herein by reference for all purposes.

BACKGROUND OF THE INVENTION

Storage devices that store data typically react to mitigate the effects of undesirable events after detecting the occurrence of such undesirable events. An example of an undesirable event may include the usage of a threshold percentage of storage space at a storage device. However, even if the effects of an undesirable event may be improved by a subsequent action (e.g., the migration of some files away from the storage device at which the undesirable event has occurred), the storage device may still suffer lowered performance for a period of time.

BRIEF DESCRIPTION OF THE DRAWINGS

Various embodiments of the invention are disclosed in the following detailed description and the accompanying drawings.

FIG. 8 is an example of a storage device specific predicted metric data structure.

DETAILED DESCRIPTION

Figure 1:
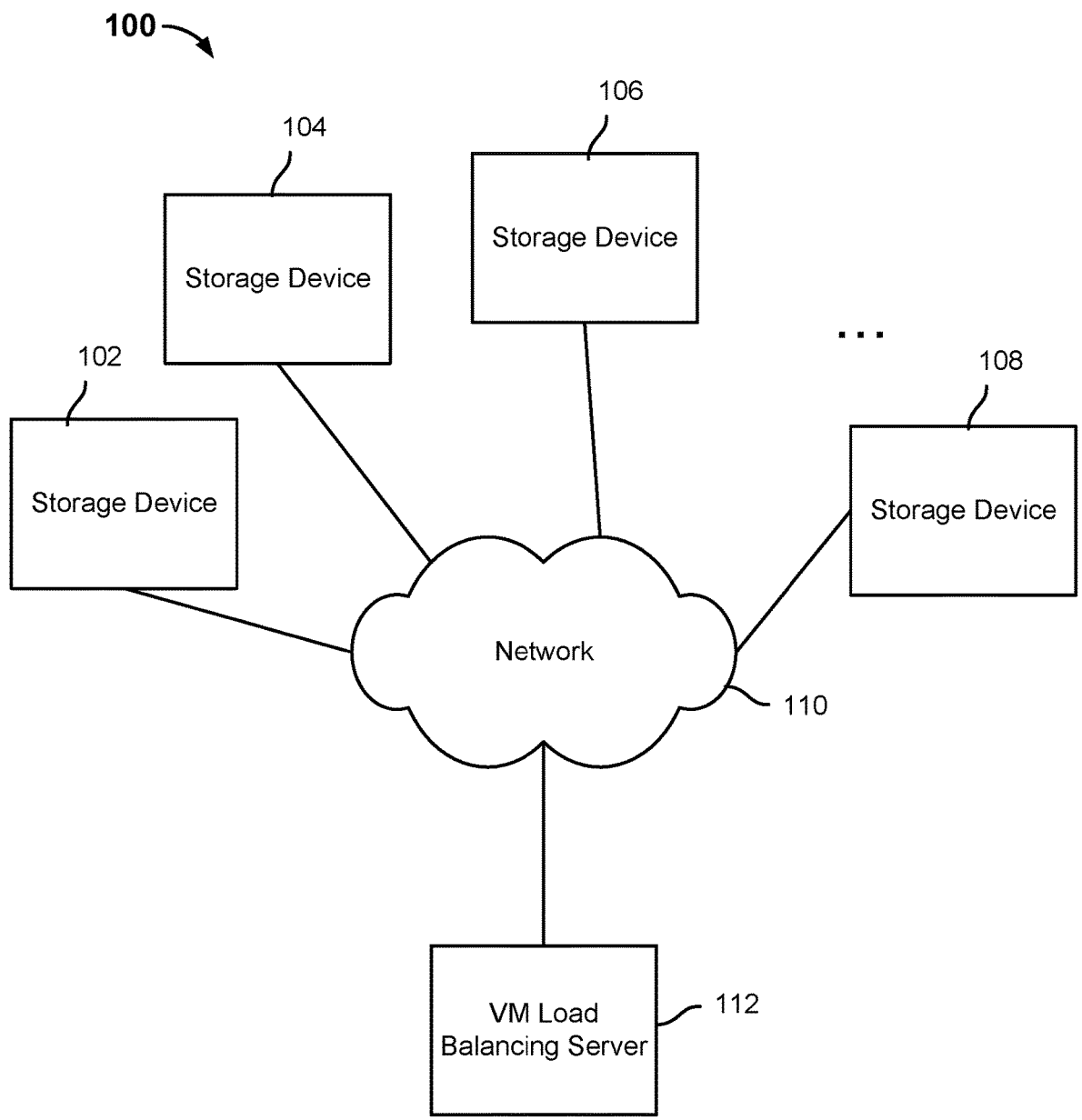
FIG. 1 is a diagram showing an embodiment of a system for performing load balancing using predictive analytics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of load balancing using predictive virtual machine analytics are described herein. A plurality of storage device specific predicted metric data structures corresponding to respective ones of a plurality of storage devices is determined. In various embodiments, the plurality of storage devices belongs to the same "pool" of storage devices. In various embodiments, which two or more storage devices belong to a pool is user defined. For example, storage devices that belong to the same pool may be geographically proximate to each other and/or share another type of common attribute. In various embodiments, a storage device specific predicted metric data structure comprises multiple predicted metrics associated with different metric types (e.g., undesirable events associated with space usage, flash hit rate, and/or load) that have been generated based on the aggregated historical data associated with virtual machines (VMs) stored on a corresponding storage device. In various embodiments, the predicted metrics associated with different metric types that are included in a data structure for a corresponding storage device are stored in the data structure in an order that is associated with the respective priorities of metric types. The plurality of storage device specific predicted data structures corresponding to the respective ones of the plurality of storage devices is combined into a combined predicted metric data structure. In various embodiments, combining the plurality of storage device specific predicted data structures includes combining the predicted metrics of the storage device specific predicted data structures associated with the same metric type (e.g., the same position within the data structures) to determine a combined or pool-level predicted metric associated with that metric type. In various embodiments, the combined predicted metric data structure comprises a pool-level data structure of predicted metrics. A combined predicted metric to improve is selected from the combined predicted metric data structure. The selected combined predicted metric is used to determine a VM to move from a first storage device included in the plurality of storage devices to a second storage device included in the plurality of storage devices to potentially improve the selected combined predicted metric. As will be described in further detail below, it may be determined and subsequently recommended at a user interface that one or more VMs should be moved from their respective source storage devices to a different, destination storage device within the same pool of storage devices because these migrations are predicted to improve at least one predicted combined, pool-level metric. As such, by predicting the future occurrence of undesirable events, VMs may be load balanced among storage devices in a pool to potentially preempt later occurring problems.

FIG. 1 is a diagram showing an embodiment of a system for performing load balancing using predictive analytics. In the example, system 100 includes storage device 102, storage device 104, storage device 106, network 110, storage device 108, and VM load balancing server 112. In various embodiments, network 110 includes various high-speed data networks and/or telecommunications networks. In various embodiments, system 100 includes storage device 102, storage device 104, storage device 106, storage device 108, and VM load balancing server 112 communicate with each other over network 110. In the example, each of storage device 102, storage device 104, storage device 106, and storage device 108 store data related to one or more VMs for which data is currently stored on the respective storage device. Each of storage device 102, storage device 104, storage device 106, and storage device 108 is configured to store historical data at different historical points in time with respect to the VMs that are currently and/or have previously resided at that storage device. In some embodiments, VM load balancing server 112 is configured to keep track of which VMs currently reside at which storage device. In some embodiments, a VM may have data stored at different storage devices and are referred to as "multi-component VMs." In some embodiments, VM load balancing server 112 is configured to store aggregated historical data associated with a multiple-component VM.

At least two of storage device 102, storage device 104, storage device 106, and storage device 108 may be defined by a user to be included in the same pool of storage devices. In various embodiments, a pool of storage devices comprises storage devices that share at least one common attribute (e.g., the storage devices are located within the same geographic area and/or are owned by the same entity). VM load balancing server 112 is configured to obtain historical data corresponding to various VMs from the storage devices at which the VMs reside and use the historical data to generate predicted metrics for each storage device based on the historical VM data obtained from that storage device. In various embodiments, a "predicted metric" comprises a probability that a particular event, which is sometimes referred to as a "metric type," may occur at any point within a window of time in the future. A predicted metric may comprise a probability that is a single value or a range of probabilities. For example, a metric type may comprise an undesirable event across one or more storage devices and/or an event that is to trigger load balancing of VMs among storage devices of the pool. For example, the historical VM data from the past 30 days may be used to generate a metric within the subsequent seven days. In various embodiments, a user configurable/tunable historical window of time associated with historical VM data may be used to make a predicted metric within a user configurable/tunable future window of time. VM load balancing server 112 is configured to include the predicted metrics generated for each storage device into a data structure that corresponds to that storage device. In some embodiments, the data structure is a vector. In various embodiments, VM load balancing server 112 is configured to include the predicted metrics generated for each storage device into a corresponding data structure such that the position of each predicted metric corresponds to a priority associated with that particular metric type. For example, the predicted metric associated with the highest priority metric type is stored in the first position in the vector, the predicted metric associated with the second highest priority metric type is stored in the second position in the vector, and so forth.

After VM load balancing server 112 has generated a storage device specific predicted metric data structure for each storage device in a pool, VM load balancing server 112 is configured to combine the storage device specific predicted metric data structures associated with the storage devices in the pool into a combined, pool-level predicted metric data structure. For example, storage device 102, storage device 104, storage device 106, and storage device 108 are included in the same pool and so VM load balancing server 112 has generated a storage device specific predicted metric data structure corresponding to each of storage device 102, storage device 104, storage device 106, and storage device 108. Then, VM load balancing server 112 is configured to combine the storage device specific predicted metric data structure corresponding to each of storage device 102, storage device 104, storage device 106, and storage device 108 together to determine a combined, pool-level predicted metric data structure. In various embodiments, combining the storage device specific predicted metric data structures associated with the storage devices in the pool into the combined, pool-level predicted metric data structure includes determining the joint probability of all predicted metrics associated with the same metric type across the storage device specific predicted metric data structures as the combined, pool-level predicted metric for the same metric type. As such, each combined predicted metric of the combined predicted metric data structure represents the predicted probability that the event of the corresponding metric type will happen at any point to any storage device in the pool in a configured window of time in the future.

VM load balancing server 112 will identify one or more predicted metrics within the combined predicted metric data structure that are to be improved. In various embodiments, one or more predicted metrics are determined to be improved by comparing those values to one or more respective threshold values. Similar to predicted metrics, a threshold value can either be a single value or a range of values. For example, if a combined predicted metric is greater than a threshold value associated with the corresponding metric type, then the combined predicted metric is determined to be improved. For example, the combined predicted metric that is to be improved may be a probability (e.g., 78%) that any storage device in the pool is to exceed 98% of its space capacity in the next seven days (e.g., or whichever user configured window of time in the future) exceeding a corresponding threshold value (e.g., 70%).

VM load balancing server 112 is configured to use each combined, pool-level predicted metric that is identified to be improved to select one or more VMs to move/migrate from their current/source storage devices within the pool to a different destination storage device within the pool. Moving the one or more VMs from their current/source storage devices within the pool to a different destination storage device within the pool is predicted to improve at least the identified combined, pool-level predicted metric that is identified to be improved. In the event that a combined, pool-level predicted metric is defined to be a probability that an undesirable event will happen to any storage device within the pool at any time in a configured window of time in the future, "improving" that combined predicted metric includes lowering the probability that the undesirable event will happen (e.g., to be below the threshold value corresponding to that metric type). In various embodiments, it is predicted that moving the one or more VMs from their current/source storage devices within the pool to a different destination storage device within the pool will improve the identified combined, pool-level predicted metric that is identified to be improved based on computing a updated combined, pool-level predicted metric data structure based on a hypothetical ("what-if") scenario in which the historical data of the one or more VMs are removed from their current/source storage device and instead assumed to be already stored at the destination storage device. In some embodiments, VM load balancing server 112 is configured to determine one or more sets of VMs to move to respective destination storage devices within the pool to potentially improve each combined, pool-level predicted metric that is selected to be improved. In some embodiments, VM load balancing server 112 is configured to present the determined sets of VMs and their respective destination storage devices the sets of VMs are determined to move to as one or more recommendations for a user to approve. For example, each recommendation identifies which VMs to move, the source storage devices of the VMs, the destination storage devices of the VMs, and the metric type that the VM migrations are predicted to improve. In response to a user selection to approve a recommendation, VM load balancing server 112 is configured to initiate the migration of the data of the VMs included in the recommendation from their respective source storage device(s) to their destination storage device. In some embodiments, a recommendation may be automatically implemented without any user input/approval. In some embodiments, the actual migration of VM data from one storage device to another may be performed by a hypervisor and/or the source storage device and/or the destination storage device.

In some embodiments, after a recommendation is implemented (i.e., VMs included in the recommendation are migrated between storage devices in the pool), the historical data associated with migrated VMs will be removed from their former/source storage devices and then added to the aggregated historical VM data of their current/destination storage devices such that subsequently generated predicted metrics may be computed based on historical data of only VMs that are actually residing at each storage device. In various embodiments, "aggregated historical VM data" refers to the combination (e.g., sum or other combination) of historical data across one or more VMs that reside at a storage device. In various embodiments, the modified historical data of VMs stored at a storage device is referred to as the "effective" historical data (as opposed to "actual" historical data, which refers to historical data associated with even VMs that do not currently reside at a certain storage device). As such and as will be described in further details below, the aggregated historical data of VMs that is stored at each storage device and used for making predicted metrics comprises aggregated "effective" historical data.

Figure 2:
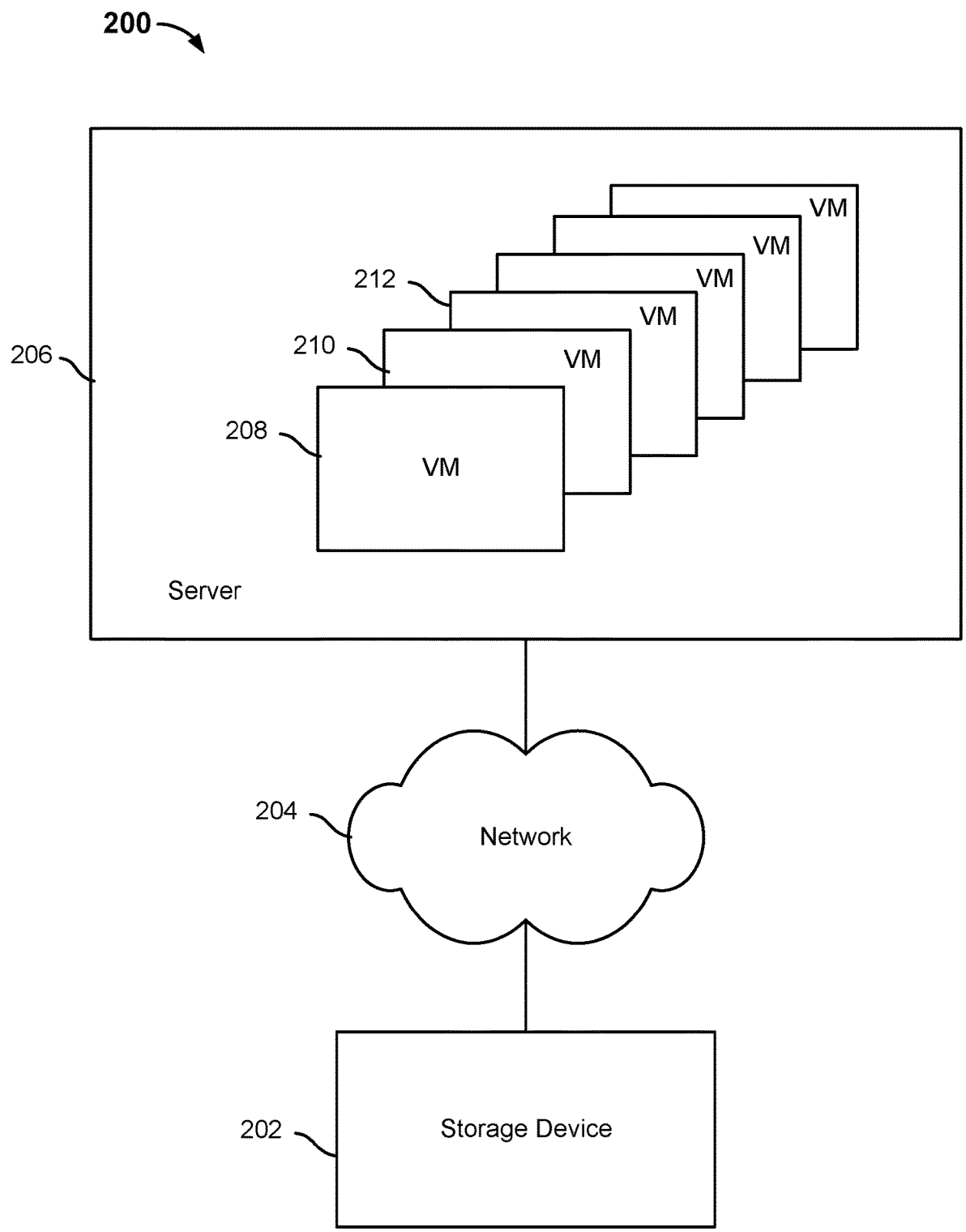
FIG. 2 is a diagram showing an embodiment of a storage device for the storage of VMs using virtual machine storage abstractions.

FIG. 2 is a diagram showing an embodiment of a storage device for the storage of VMs using virtual machine storage abstractions. In the example shown, system 200 includes server 206, network 204, and storage device 202. In various embodiments, network 204 includes various high-speed data networks and/or telecommunications networks. In some embodiments, storage device 202 communicates with server 206 via network 204. In some embodiments, the file system for the storage of VMs using VM storage abstractions does not include network 204, and storage device 202 is a component of server 206. In some embodiments, server 206 is configured to communicate with more storage systems other than storage device 202. Each of storage devices 102, 104, 106, and 108 of system 100 of FIG. 1 may be implemented using a storage device such as storage device 202 of system 200.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating the system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage device as one or more files. In various embodiments, the files are examples of VM storage abstractions. In some embodiments, the respective files associated with (at least) VMs 208, 210, and 212 running on server 206 are stored on storage device 202.

In various embodiments, storage device 202 is configured to store meta-information identifying which stored data objects, such as files or other VM storage abstractions, are associated with which VM or vdisk. In various embodiments, storage device 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage device 202 also stores at least a portion of the files associated with the specific VMs in addition to the mappings to those files. In various embodiments, storage device 202 refers to one or more physical systems and/or associated hardware and/or software components configured to work together to store and manage stored data, such as files or other stored data objects. In some embodiments, a hardware component that is used to (at least in part) implement the storage device may be comprised of one or a combination of multiple tiers of storage types. For example, storage device 202 may include tiers of storage types such as hard disk drive (HDD or "disk") and/or solid state drive (SSD or "flash"). In various embodiments, a type of storage is considered to be in a higher tier if it has faster accesses relative to a type of storage that is considered to be in a lower tier. In various embodiments, the higher tier type of storage (e.g., flash storage) at storage device 202 is configured to store more frequently accessed and/or otherwise higher priority VM data and lower tier type of storage (e.g., disk storage) at storage device 202 is configured to store less frequently accessed and/or otherwise lower priority VM data.

Figure 3:
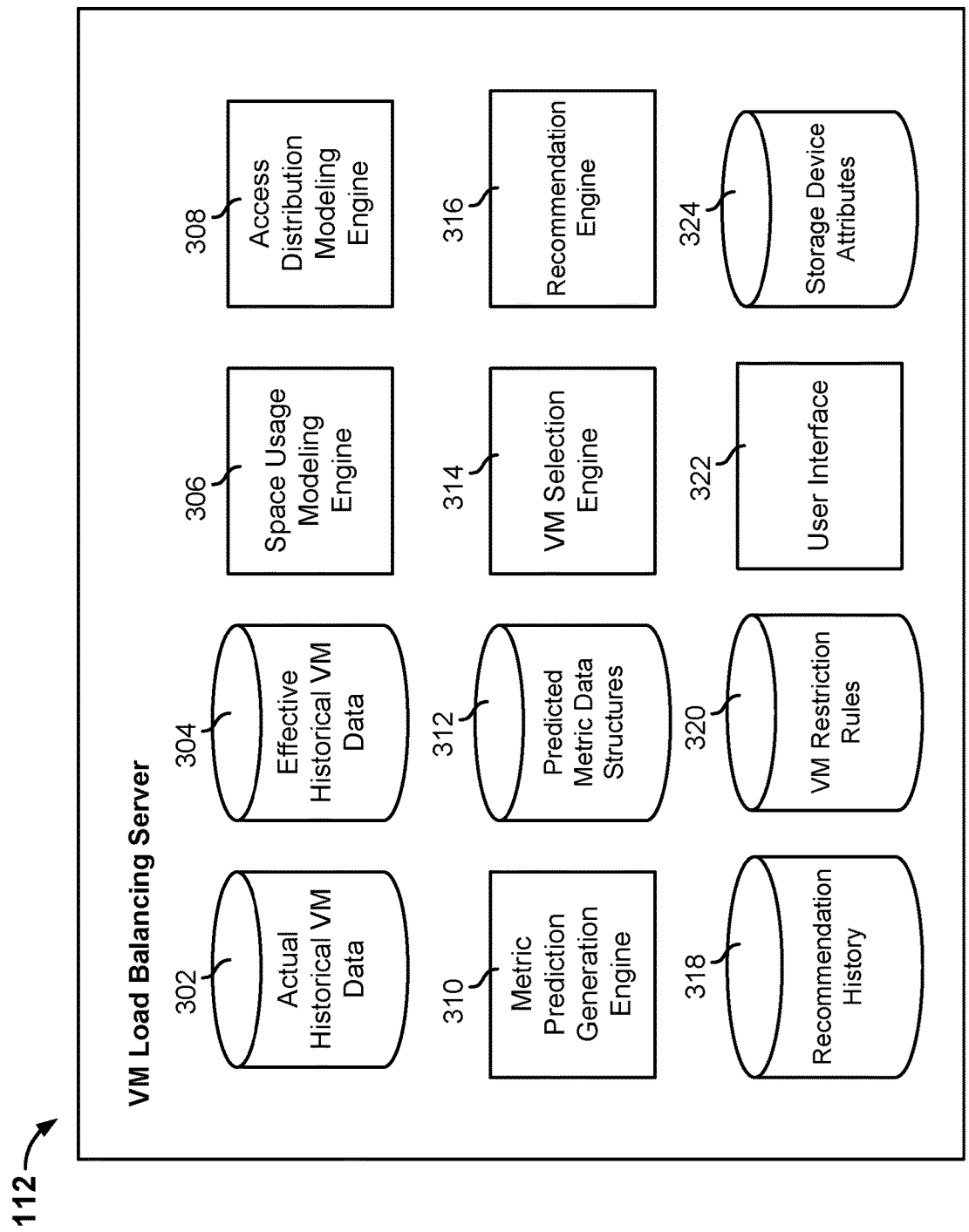
FIG. 3 is a diagram showing an example of a VM load balancing server.

FIG. 3 is a diagram showing an example of a VM load balancing server. In the example VM load balancing server of FIG. 3, the VM load balancing server includes actual historical VM data storage 302, effective historical VM data storage 304, space usage modeling engine 306, access distribution modeling engine 308, metric prediction generation engine 310, predicted metric data structures storage 312, VM selection engine 314, recommendation engine 316, recommendation history storage 318, VM restriction rules storage 320, user interface 322, and storage device attributes 324. In some embodiments, space usage modeling engine 306, access distribution modeling engine 308, metric prediction generation engine 310, VM selection engine 314, recommendation engine 316, and user interface 322 may each be implemented using one or both of hardware and/or software. In some embodiments, actual historical VM data storage 302, effective historical VM data storage 304, predicted metric data structures storage 312, recommendation history storage 318, VM restriction rules storage 320, and storage device attributes 324 may be implemented using one or more databases. In various embodiments, a VM load balancing server may include additional, fewer, and/or different components than those described in FIG. 3.

Actual historical VM data storage 302 is configured to store the actual historical VM data of VMs that have previously resided and/or currently reside on a storage device. In various embodiments, the VM load balancing server is configured to generate predicted metrics for storage devices in a pool and then to generate recommendations of which sets of VMs to move from their source storage devices to a destination storage device within the same pool in order to improve a combined, pool-level predicted metric. Examples of actual historical VM data comprise performance attributes (e.g., storage space usage and load), how much of a VM's data is stored in disk versus flash, and/or how many times each VM's block in disk/flash has been accessed. In some embodiments, actual historical VM data storage 302 is configured to store, for each VM, a historical attribute value at each predetermined historical interval for a predetermined length of time. An example historical attribute value is space usage and as such, actual historical VM data storage 302 may store a space usage attribute value corresponding to how much space each VM at the storage device at which it is residing consumes on each day of a window of time in the past. In some embodiments, if a VM has data that is stored across multiple storage devices, then actual historical VM data storage 302 is configured to store the aggregated historical attribute value of the multi-component VMs across the multiple storage devices at each predetermined historical interval for a predetermined length of time. In some embodiments, at least some of the actual historical VM data corresponding to a VM is also stored at each storage device that stores data of that VM.

Effective historical VM data storage 304 is configured to store the effective historical data of VMs that currently reside on a storage device. Examples of effective historical VM data comprise performance attributes (e.g., storage space usage and load) and also how much of a VM's data is stored in disk versus flash and/or how many times each VM's block in disk/flash has been accessed. As mentioned above, after a VM is moved from its source storage device to a destination storage device (e.g., as a result of a user approving a recommendation that includes such a move), the effective historical VM data at each of the source storage device and the destination storage device is updated. At the source storage device, the historical VM data of the migrated VM is removed. For example, if "VM-123" had been moved off of a source storage device and the source storage device had stored a historical space usage attribute value corresponding to "VM-123" at each predetermined historical interval (e.g., day) for a predetermined length of time (e.g., at least 30 days), then the historical space usage attribute value corresponding to "VM-123" would either be discarded from the source storage device or at least indicated to be ignored in making predicted metrics for the source storage device. Similarly, for example, the historical space usage attribute value corresponding to "VM-123" at each predetermined historical interval (e.g., day) for a predetermined length of time that was previously stored at the former source storage device is then added to the destination/current storage device. The purpose of updating the effective historical VM data at the source and destination storage devices after a VM migration is so that the updated effective historical VM data at each storage device could accurately reflect the historical data of VMs that currently reside on the storage device (and not that of VMs that no longer currently reside on the storage device). As such, the effective historical VM data at a storage device may be used to make accurate predicted metrics for the storage device. In some embodiments, at least some of the effective historical VM data corresponding to a VM is also stored at each storage device on which the VM resides.

Space usage modeling engine 306 is configured to generate predicted metrics related to space usage related metric types. In some embodiments, space usage modeling engine 306 is configured to input the effective historical VM data related to space usage at each storage device (e.g., how much aggregated storage space one or more VMs that currently reside at the storage device consume) (e.g., that is stored either at the storage device and/or at effective historical VM data storage 304) from a configured historical window of time (e.g., the past 30 days) into one or more statistical models. In some embodiments, space usage modeling engine 306 is configured to input historical non-VM data related to space usage at each storage device from a configured historical window of time to identify non-VM related space usage trends as well. As such, VMs may be recommended to be moved between storage devices to load balance (e.g., free up storage resources at the source storage devices) even when the VMs themselves may not be the source of space growth. The one or more statistical models use at least a subset of the input effective historical VM data related to space usage to output various predictions of predicted VM space usage for the VM(s) at the storage device (e.g., how much aggregated storage space one or more VMs that currently reside at the storage device is predicted to consume) at any point in time in a configured window of time in the future (e.g., the next seven days). The outputs from the statistical models may be sorted and the sorted distribution of predicted VM space usage at the storage device may be used to generate the predicted metric at the storage device corresponding to one or more space usage related metric types. For example, example space usage related metric types are the probability that 100% of the space at the storage device is predicted to be consumed at any time within the next seven days, the probability that 98% of the space at the storage device is predicted to be consumed at any time within the next seven days, and the probability that 95% of the space at the storage device is predicted to be consumed at any time within the next seven days. In some embodiments, the predicted metric (the probability) corresponding to a space usage related metric type (e.g., the probability that 100% of the space at the storage device is predicted to be consumed at any time within the next seven days) may be a range of probabilities/percentages that is determined by adding and/or subtracting an interval from a single value that is determined from sorted distribution of predicted VM space usage at the storage device.

In some embodiments, space usage modeling engine 306 is configured to generate updated space usage related metric types by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, space usage modeling engine 306 is configured to generate space usage related metric types by using the aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Access distribution modeling engine 308 is configured to generate predicted metrics related to access rate related metric types. In some embodiments, a storage device includes at least a higher tier of storage comprising flash and at least a lower tier of storage comprising disk. In some embodiments, the flash storage is configured to store frequently accessed and/or otherwise higher priority data and the disk storage is configured to store less frequently accessed and/or otherwise lower priority data. In some embodiments, due to the higher cost of flash (or another higher tier of storage associated with faster accesses), the amount of flash in a storage device is limited and typically entirely consumed (e.g., up to the configured allotted/maximum percentage of flash space) for storing VM data. The remaining VM data that is not serviced by flash and/or is evicted from flash at a storage device is stored at disk at the storage device. In some embodiments, the amount of the disk (or another lower tier of storage associated with faster accesses) is less limited than flash and is able to store data that does not meet the criteria for being stored in flash. In some embodiments, access distribution modeling engine 308 is configured to use the aggregated effective historical VM data related to accesses made at flash and disk at each storage device (e.g., how many times each flash block was accessed and how many times disk was accessed) (e.g., that is stored either at the storage device and/or at aggregated effective historical VM data storage 304) from a configured historical window of time (e.g., the past seven days) to model a distribution of flash and disk at the storage device. Access distribution modeling engine 308 is configured to determine a measured "flash hit rate" at the storage device based on the aggregated effective historical VM data (e.g., of the past seven days). In various embodiments, the "flash hit rate" refers to the percentage of accesses at the storage device that were serviced by flash (i.e., the percentage that requested data was found in flash). In various embodiments, the "flash miss rate" refers to the percentage of accesses at the storage device that was serviced by disk (i.e., the percentage that requested data was found in disk). The relationship between the flash hit rate and the flash miss rate is such that their sum is always 1. Example access rate metric types are the maximum between the flash miss rate and 3%, the maximum between the flash miss rate and 1%, and the maximum between the flash miss rate and 0.1%.

In some embodiments, access distribution modeling engine 308 is configured to use the measured flash hit rate and the measured access distribution across flash and disk to determine a prediction parameter (which is sometimes referred to as the "d" parameter) that comprises a probability of access of the most frequently accessed block in disk at the storage device. Then, in modeling the updated access rate related predicted metrics in response to a hypothetical (what-if) addition of a VM to the storage device or the hypothetical removal of a VM from the storage device, in some embodiments, access distribution modeling engine 308 is configured to use the "d" parameter that was previously computed for the storage device to determine the updated flash hit rate (or flash miss rate). In some embodiments, access distribution modeling engine 308 is configured to generate an updated access rate related metric type by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, access distribution modeling engine 308 is configured to generate updated access rate related metric types by using aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Metric prediction generation engine 310 is configured to generate a storage device specific predicted metric data structure corresponding to each storage device. In some embodiments, the storage device specific predicted metric data structure comprises a vector (e.g., a one-dimensional array). In various embodiments, metric prediction generation engine 310 is configured to include/insert the predicted metrics that were generated (e.g., by space usage modeling engine 306 and/or access distribution modeling engine 308) for the storage device in a corresponding storage device specific predicted metric data structure. In various embodiments, metric prediction generation engine 310 is configured to include the predicted metrics in the corresponding storage device specific predicted metric data structure in a manner such that each predicted metric is included in the data structure at a position associated with a priority corresponding to the metric type of that predicted metric. For example, the predicted metric associated with the metric type that is associated with the highest priority is included in the element that is associated with the lowest index/first position of the vector, the predicted metric associated with the metric type that is associated with the second highest priority is included in the element that is associated with the second lowest index/second position of the vector, and so forth. In some embodiments, metric prediction generation engine 310 is configured to store the storage device specific predicted metric data structures at predicted metric data structures storage 312.

Metric prediction generation engine 310 is further configured to combine the storage device specific predicted metric data structure corresponding to each storage device that is associated with a pool of storage devices into a combined, pool-level predicted metric data structure. In some embodiments, the combined, pool-level predicted metric data structure comprises a vector (e.g., a one-dimensional array). In various embodiments, to determine the combined, pool-level predicted metric data structure, metric prediction generation engine 310 is configured to determine the joint probability among the predicted metrics of the same metric type corresponding to the storage device specific predicted metric data structures corresponding to all storage devices of the pool. Metric prediction generation engine 310 is configured to include/insert each joint probability corresponding to each metric type into the combined, pool-level predicted metric data structure at a position associated with a priority corresponding to the metric type. For example, the combined predicted metric (e.g., the joint probability) of the storage device specific predicted metrics associated with the metric type of the highest priority may be included in the element that is associated with the lowest index/first position of the vector, the combined predicted metric of the storage device specific predicted metrics associated with the metric type of the second highest priority may be included in the element that is associated with the second lowest index/second position of the vector, and so forth. In some embodiments, metric prediction generation engine 310 is configured to store the combined, pool-level predicted metric data structure corresponding to each pool at predicted metric data structures storage 312.

VM selection engine 314 is configured to select sets of VMs to move from their source storage device(s) to destination storage device(s) within the same pool of storage devices. In various embodiments, VM selection engine 314 is configured to compare each combined predicted metric of a combined predicted metric data structure associated with a pool to a predetermined threshold value associated with the corresponding metric type. In the event that the combined predicted metric exceeds the predetermined threshold value, then the combined predicted metric (and its associated metric type) is identified as one that is to be improved. For example, each predetermined threshold value comprises a high probability of the occurrence of the metric type (e.g., an undesirable scenario or event). In some embodiments, VM selection engine 314 is configured to determine candidate sets of VMs to move off their current source storage device(s) such that by doing so, the updated combined predicted metric of one or more metric types associated with combined predicted metrics may be improved (e.g., their probabilities may be lowered below the predetermined threshold values). In some embodiments, VM selection engine 314 is configured to determine which destination storage device to move a candidate set of VMs such that by doing so, the updated combined predicted metrics improve over their current values, with preference given to improving those combined predicted metrics associated with metric types associated with higher priorities. In some embodiments, VM selection engine 314 is configured to use user configured rules and/or other rules in VM restriction rules storage 320 (e.g., rules that determine which VMs can or cannot be moved to and from) to constrain the search for which sets of VMs to move and how. In some embodiments, VM selection engine 314 is configured to use storage device attributes (e.g., maximum capacity, flash capacity, compression/dedupe capabilities, and maximum normalized IOPS) stored at storage device attributes storage 324 to constrain the search for which sets of VMs to move and how. In some embodiments, VM selection engine 314 is further configured to use the relative performance of each storage device to other storage devices within the same pool to constrain the search for which sets of VMs to move and how. In some embodiments, a metric of "performance reserves" is computed by each storage device as a measure of its available performance capacity. In some embodiments, the performance reserves of a storage device are shown on a scale of 0 to 100%. Some storage devices have greater performance, so when moving a VM, the performance reserves need to be re-evaluated in terms of their impact on the new storage device. Re-evaluating performance reserves is performed by constructing the effective data from the source of the performance reserves computation (e.g., IOPS and throughput measurements) rather than previously determined performance reserves themselves. In another example, the performance reserves may also be scaled up and down based on the relative capacities of the storage device models. This is just a scaling factor associated with each model, and so would be similar to other storage device attributes like maximum capacity. In some embodiments, VM selection engine 314 is configured to cause space usage modeling engine 306 and access distribution modeling engine 308 to respectively generate updated storage device specific predicted metrics for different hypothetical/candidate migrations of sets of VMs between storage devices of the same pool. In some embodiments, VM selection engine 314 is configured to cause metric prediction generation engine 310 to generate updated combined predicted metrics for different hypothetical/candidate migrations of sets of VMs between storage devices of the same pool. In some embodiments, VM selection engine 314 is configured to send a selection of a set of VMs to move from their source storage device(s) to a destination storage device to recommendation engine 316.

Recommendation engine 316 is configured to generate a set of recommendations that includes selections of one or more sets of VMs to be moved from their current storage device(s) to respective new destination storage device(s) within the same pool. In some embodiments, each recommendation identifies the VMs to move, the source storage device(s) of the VMs, the destination storage device(s) of the VMs, and the expected benefit of the migration (e.g., the combined predicted metric of which metric type is predicted to be improved as a result of the migration). Recommendation engine 316 is configured to store the set of recommendations in recommendation history storage 318. In various embodiments, recommendation engine 316 is configured to cause a set of recommendations to be presented at user interface 322. A user may approve of one or more recommendations to be implemented via a selection at user interface 322. A user may also reject one or more recommendations to be implemented via a selection at user interface 322. Recommendation engine 316 is configured to initiate the implementation of the VM migration(s) associated with each of one or more user approved recommendations by, for example, sending data to a hypervisor associated with the VM(s) to migrate and/or a storage device from which the VM(s) are to be moved from/to.

Recommendation engine 316 is configured to periodically determine whether a recommendation that is presented at user interface 322 is still valid. In some embodiments, recommendation engine 316 may determine whether any circumstances changed since a recommendation was generated such that it would no longer be available to be implemented. For example, a deletion of a VM that is included in a recommendation may cause that recommendation to become invalidated. Invalidated recommendations may be removed from being presented at user interface 322 and in some embodiments, the invalidation of a recommendation may trigger the presentation of a previously generated but not presented recommendation and/or the presentation of a new, alternative recommendation.

Recommendation history 318 is configured to store a history of previously generated recommendations. Recommendation history 318 may also store data indicating which historical recommendations were approved by a user to be implemented, which recommendations were not approved, and which recommendations were invalidated (and for which reason). In some embodiments, recommendation engine 316 is configured to periodically determine whether the combined predicted metrics associated with historical recommendations (whether they were approved to be implemented or not) matched the subsequent actual combined metrics of each pool of storage devices. The determined accuracy of the historical recommendations may be used to improve subsequent metric predictions.

Figure 4:
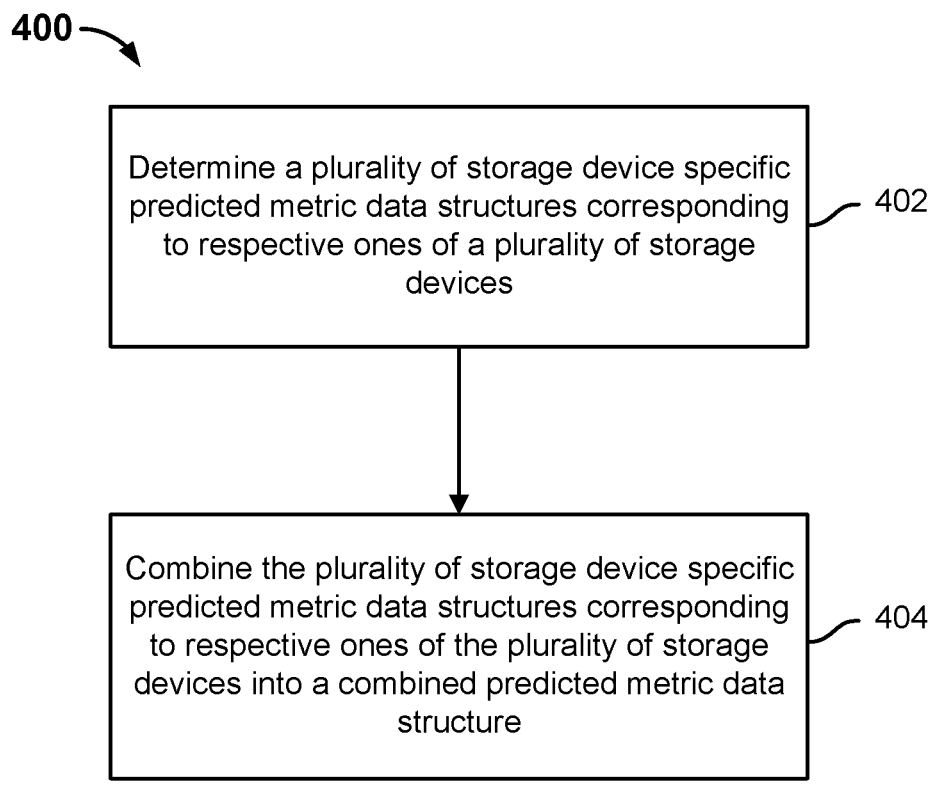
FIG. 4 is a flow diagram showing an embodiment of a process for load balancing based on predictive analytics.

FIG. 4 is a flow diagram showing an embodiment of a process for load balancing based on predictive analytics. In some embodiments, process 400 is implemented by VM load balancing server 112 of system 100 of FIG. 1.

At 402, a plurality of storage device specific predicted metric data structures corresponding to respective ones of a plurality of storage devices is determined. Two or more storage devices are designated by a user to be included in a pool. Predicted metrics related to different metric types (e.g., space usage, access rate, and load) are determined for each storage device in the pool based on the aggregated effective historical VM data of one or more VMs that are stored at each storage device. The predicted metrics determined for each storage device are included/inserted in a data structure (e.g., a vector) corresponding to that storage device in a manner that reflects the different priorities associated with the metric types of the predicted metrics.

At 404, the plurality of storage device specific predicted metric data structures corresponding to respective ones of the plurality of storage devices is combined into a combined predicted metric data structure. The predicted metrics across the storage device specific predicted metric data structures that are associated with the same metric type (e.g., and are located at the same position in each of the data structures) are combined (e.g., by determining a joint probability or by being added together) into a combined predicted metric. Each combined predicted metric is included/inserted into the data structure (e.g., a vector) corresponding to the pool in a manner that reflects the different priorities associated with the metric types of the combined predicted metrics.

In various embodiments, a combined predicted metric to improve is selected from the combined predicted metric data structure. In various embodiments, each combined predicted metric is compared against a predetermined threshold value corresponding to its metric type. In the event that a combined predicted metric exceeds a corresponding predetermined threshold value, the combined predicted metric is selected as a basis for performing load balancing of VMs across the storage devices of the pool.

In various embodiments, the selected combined predicted metric is used to determine a VM to move from a first storage device included in the plurality of storage devices to a second storage device included in the plurality of storage devices to potentially improve at least a portion of the combined predicted metric data structure. In various embodiments, a selected combined predicted metric is used to identify candidate sets of VMs to move from their source storage devices such that the removal of the VMs from their source storage devices is predicted to result in an updated combined predicted metric data structure with at least some combined predicted metrics that are better (e.g., comprising lower probabilities of the occurrence of the associated metric types/undesirable events) than the current combined predicted metric data structure. In various embodiments, an identified candidate set of VMs is determined to be moved to a particular destination storage device within the pool due to a prediction that the migration will improve at least one combined predicted metric of the pool. The identified candidate set of VMs and their determined destination storage device may be included in a recommendation that is presented at a user interface.

The following are example use cases for presenting VM load balancing recommendations:

Use Case 1

At least twice per day, a new recommendation is shown to the user for each pool that the user defined. This recommendation specifies the metric type of imbalance (e.g., space usage, access rate, QoS, I/O throughput, etc.), a list of VMs to be moved between storage devices in the pool, and the expected benefit of accepting the recommendation. The user may accept the recommendation any time within the next 12 hours (or other configurable period of time), and the system will start to move the VMs, including any snapshots of the VMs.

In various embodiments, recommendations do not move VMs across pools. Recommendations may specify multiple VMs (to multiple destinations), but in some embodiments, the user is required to accept or reject the VMs associated with one recommendation as a unit. The user is, of course, still free to initiate a migration of a VM on his or her own.

Use Case 2

It may be that the pool is already adequately balanced—that is, there is no pressing issue and it does not appear that any movement of VMs is worthwhile. In this case, the user sees a message that there is no recommendation and no action is required.

Use Case 3

In other cases, no recommendation can be generated for the pool because there is no available capacity on any storage device. Or, a recommendation may be impossible because of constraints placed on the movement of VMs (e.g., due to affinity rules, different sub-mounts, or lack of topological connection). In these cases, a normal recommendation is replaced by an explanation of which resources are in high demand, and possibly a suggestion as which VMs are high consumers of that resource.

Use Case 4

Sometimes a recommendation may become obsolete. For example, a recommendation may become obsolete due to a VM being moved, the contents of a pool being modified, and/or the VM load balancing server being restored from backup. In some embodiments, after a recommendation is generated, it is periodically checked whether a recommendation is still valid (e.g., available to be presented to and approved by a user).

Use Case 5

Feedback of various sorts is collected on the accuracy and/or user approval of the metric predictions and VM migration recommendations. For example, a user may dismiss a recommendation and provide a comment about why it was not deemed worthy of approval/implementation. This information can be saved for offline analysis.

Use Case 6

The user may choose a single storage device for all "new" VMs and depend upon load balancing to move VMs off this selected target storage device and onto other storage devices in the pool. The user's preference for moving VMs off a target storage device may be configured in a user submitted rule that is recognized by the VM load balancing server.

Use Case 7

The user may be using a "cattle" model in which large numbers of VMs are temporarily created, then deleted only after a short period. The benefit of migrating such a VM to another storage device is low, since it will likely be deleted soon anyway. The user's preference for not moving (certain) VMs from a target storage device due to the fact that they will be deleted soon may be configured in a user submitted rule that is recognized by the VM load balancing server.

Use Case 8

Suppose a VM "x-vm" on Storage Device A is replicating to Storage Device B. In some embodiments, replicating a VM from one storage device to another storage device preserves the VM's UUID at the destination storage device. However, in some embodiments, migrating a VM from one storage device to another storage device causes a new UUID to be created for the VM at the destination storage device. As such, the same VM that is both replicated to and migrated to a destination storage device may cause duplicate VM data to be stored at the destination storage device as the data at the destination storage device would be recognized as two different VM UUIDs. When considering moving this VM to Storage Device C, at least the following should be taken into consideration:

Can the VM continue to replicate to Storage Device B? What is the extra outgoing replication traffic on C?

What is the extra cost in space of moving the snapshots of "x-vm" from storage device A onto Storage Device C, in the absence of a re-thinning primitive (e.g., a deduplication process)?

What is the extra cost in space of resuming replication from Storage Device C to Storage Device B? Since the new version of "x-vm" has a different UUID on Storage Device C, the first snapshot it creates will not be able to be sent as a delta against the youngest snapshot of "x-vm" already on Storage Device B. So, duplicate data will be created at Storage Device B as well.

The point of this example is that moving a VM may affect three different storage devices, not just the source and destination of migration.

Use Case 9

Some virtual infrastructure platforms (e.g., XenDesktop or vCloud Director) built on top of a virtualization tool (e.g., VMware®) make storage decisions themselves, and can break if the VM is storage migrated to a different storage device. This is because the virtual infrastructure platforms encode the storage location in other metadata.

One workaround for these cases is to ask that the user place them on sub-mounts with unique names, so that load balancing technique knows it is not allowed to move them. Another is to use affinity rules.

Use Case 10

The VM load balancing server decides to move a VM with a large written size from Storage Device A to Storage Device B. All the blocks in the VM enter Storage Device B with access count "1," pushing out many blocks with access count "0." It may be that the loss of those blocks causes user-visible performance degradation (for example, during nightly backup, they are accessed only once per day, but in a highly visible way). Until the VM's blocks are aged out appropriately, it may be "overweight" in flash and this could take several days.

In some embodiments, this risk can be mitigated in several ways:

Move working-set information (e.g., the block's access frequencies in flash) from Storage Device A to Storage Device B along with the VM data.

Change incoming storage migration-related writes to go straight to disk, or have initial access count "0," so that only the VM being moved suffers increased flash misses.

Adjust the eviction algorithm so that fewer "important" blocks have access count 0.

Figure 5:
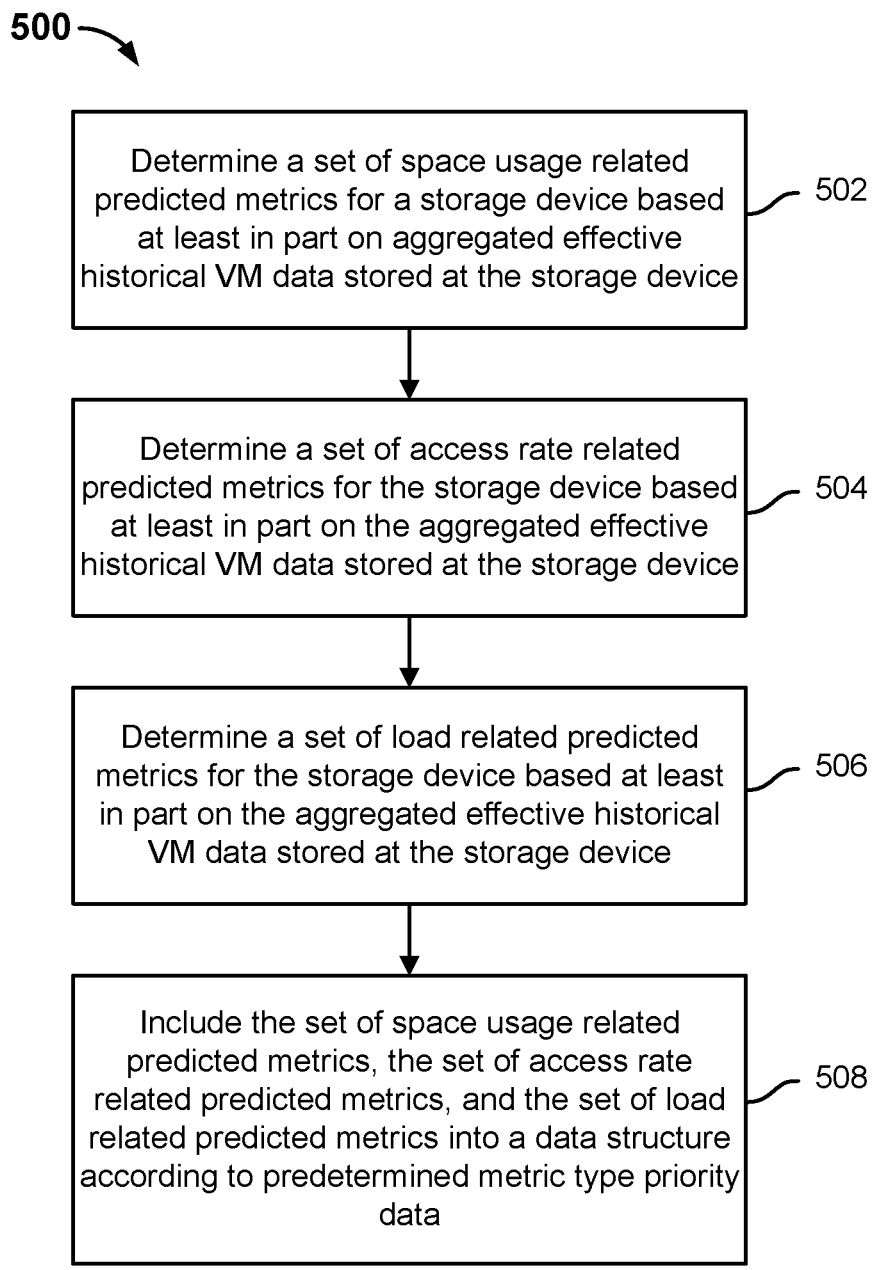
FIG. 5 is a flow diagram showing an embodiment of a process for determining a storage device specific predicted metric data structure.

FIG. 5 is a flow diagram showing an embodiment of a process for determining a storage device specific predicted metric data structure. In some embodiments, process 500 is implemented by VM load balancing server 112 of system 100 of FIG. 1. In some embodiments, 402 of process 400 of FIG. 4 is implemented at least in part using process 500.

At 502, a set of space usage related predicted metrics is determined for a storage device based at least in part on aggregated effective historical VM data stored at the storage device.

In various embodiments, the aggregated effective historical aggregated storage capacity (e.g., over the past 30 days or another configured period of time in the past) that was consumed by the one or more VMs that currently store data at a storage device is determined. For example, the historical aggregated storage capacity comprises a data point at each day (e.g., or another predetermined interval), where each data point represents a total amount of storage space that is used by the one or more VMs that store data at the storage device on that particular day.

In some embodiments, the aggregated effective historical storage capacity data is input into one or more statistical models that are configured to produce various predictions, based on the input data, on how much aggregated storage capacity will be consumed by the VMs at the storage device (e.g., at any point during the next seven days or another configured period of time in the future). At least a subset of the predictions will be sorted into a cumulative distribution function and predicted metrics corresponding to various space usage related metric types may be determined. Examples of space usage related metric types are space usage thresholds for which predicted metrics are computed as the percentage of predictions that are above the threshold of a metric type.

Table 1 below includes example thresholds for space usage metric types:

TABLE 1

| Metric Type Name | Space Usage Threshold |
| --- | --- |
| space_threshold_100 | 100% of storage device physical capacity |
| space_threshold_snapshots | 98% of storage device physical capacity |
| space_threshold_replicas | 95% of storage device physical capacity |
| space_threshold_90 | 90% of storage device physical capacity |
| space_threshold_80 | 80% of storage Device physical capacity |

In some embodiments, the predicted metrics are bounded at 1%. In some embodiments, the predicted metrics are also bounded above at 99% so that the pool metric does not saturate at 1.

In some embodiments, a space usage related predicted metric comprises a single value (a probability). In some embodiments, a space usage related predicted metric comprises a range of values (e.g., a range of probabilities, which is sometimes referred to as a "confidence interval"). For example, the confidence interval may be determined based on a Wilson interval and the computed percentage of predictions that is greater than a space threshold of a metric type. For example, the confidence interval may be determined based on adding to and also subtracting from the computed percentage of predictions that is greater than a space threshold of a metric type.

At 504, a set of access rate related predicted metrics for the storage device is determined based at least in part on the aggregated effective historical VM data stored at the storage device.

In various embodiments, the aggregated effective historical flash accesses and disk accesses (e.g., over the past seven days or another configured period of time in the past) that were made for requests to the one or more VMs that currently store data at a storage device are determined. For example, the historical aggregated flash accesses and disk accesses comprise a histogram of how many accesses were made to each block in flash and each block in disk (or any block in disk) in the past seven days. In some embodiments, the measured flash hit rate associated with the past seven days may be determined as the number of accesses to flash divided by the sum of the number of accesses to flash plus the number of accesses to disk. In some embodiments, the measured flash miss rate is determined by subtracting the flash hit rate from one (or determining the number of accesses to disk divided by the sum of the number of accesses to flash plus the number of accesses to disk). Examples of access rate related metric types include the greater of the measured flash miss rate and a predetermined flash miss rate (e.g., the maximum function with the measured flash miss rate and a predetermined flash miss rate as arguments).

Table 2 below includes example thresholds for access rate metric types:

TABLE 2

| Metric Type Name | Computation |
| --- | --- |
| flash_overcommit_97 | max( miss_rate, 0.03 ) |
| flash_overcommit_99 | max( miss_rate, 0.01 ) |
| flash_overcommit_999 | max( miss_rate, 0.001 ) |

At 506, a set of load related predicted metrics for the storage device is determined based at least in part on the aggregated effective historical VM data stored at the storage device.

In various embodiments, the read and write IOs per second (IOPS) and read and write bytes per second (throughput) are the main historical data that is used to calculate load. In some embodiments, one or more of additional measurements such as average block size, or measures of compressibility and dedupability of the data, can also be used to build a more sophisticated measure of the load placed on each storage device.

The selected inputs are combined into a single "load" measure that nominally ranges from 0 to 100% (though in some cases it could exceed 100%), where 100% is the maximum expected performance of the array.

The metrics based on this measure are "percent of time periods that were over a given load value." Examples of a given load value include 40%, 60%, and 80% load. For example, load 60 metric is max(time periods over 60% load/the number of time periods in training period, 0.01).

At 508, the set of space usage related predicted metrics, the set of access rate related predicted metrics, and the set of load related predicted metrics are included in a data structure according to predetermined metric type priority data.

In various embodiments, each determined predicted metric (e.g., space usage related, access rate related, and load related) is inserted into a data structure corresponding to the storage device in a manner in which a predicted metric is added to an element of the data structure that reflects the priority associated with the corresponding metric type. For example, the data structure corresponding to the storage device is a vector (e.g., a one-dimensional array), in which case the predicted metric associated with the highest priority metric type may be included in the first element of the vector, and the second highest priority metric type may be included in the second element of the vector, and so forth.

The following are example priorities and related goals, listed from highest to lowest priorities:

1. Space capacity. Ensure that no storage device runs out of space (e.g., prevents the scenario in which a storage device has 100% of its storage capacity consumed). If a message associated with insufficient space capacity is returned to the hypervisor in response to a write to a VM, then the VM experiences an I/O error. Usually, the I/O error will cause the VM to stop functioning and requires an immediate intervention.

2. Data protection. Preserve data protection policies (e.g., replication, snapshot, high-frequency snapshots). In some embodiments, a storage device will cease taking snapshots above a threshold space usage (e.g., 98%) and cease accepting replicas above a lower space threshold (e.g., 95%). If the VM cannot be snapshotted or replicated due to resource constraints, the user may experience data loss at a later date.

3. Guaranteed Quality-of-Service (QoS). Ensure that VMs which have guaranteed QoS can receive the desired minimum normalized IOPS. If a VM experiences high latency due to contention for resources with other VMs, the end user may see application slowdown should the system be oversubscribed. If the storage device user is a service provider, then the service provider's customers are not receiving the guaranteed "floor" that they have paid for. This situation, while requiring attention, typically does not require as high a level of escalation as missed backups or malfunctioning VMs that are associated with a lack of storage space.

4. Best-effort QoS. Attempt to reduce the number of flash misses by analyzing working-set behavior and moving VMs to where there is available flash. VMs that experience high latency but have no QoS protection are still undesirable. The goal is that as long as resources exist somewhere within the pool, no VM should suffer. For example, the VM load balancing server should seek to avoid flash misses.

5. Topology-induced latency. An attempt to eliminate "hot spots" of high IOPS or throughput. Provide consistent performance to VMs. VMs should ideally be placed so that their network connection to the host they are running on is good. For example, it is not desirable to move a VM to a separate rack from its storage.

In various embodiments, each of the above user priorities match up with one or more metric types for which predicted metrics are included in a predicted metric data structure. In some embodiments, user priority 2) corresponds to two different thresholds in a predicted metric data structure: snapshots stopping, and replication stopping. User priority 4) mentions only flash explicitly, but load metrics also seek to satisfy these user requirements, so, in some embodiments, user priority 4) matches four metric types in a predicted metric data structure.

In some embodiments, low-priority versions of these metrics (with lower thresholds) are added in a predicted metric data structure to aid in tiebreaking.

In some embodiments, users of a pool of storage devices may be enabled to configure different priorities and/or relative priorities for their pool.

Figure 6:
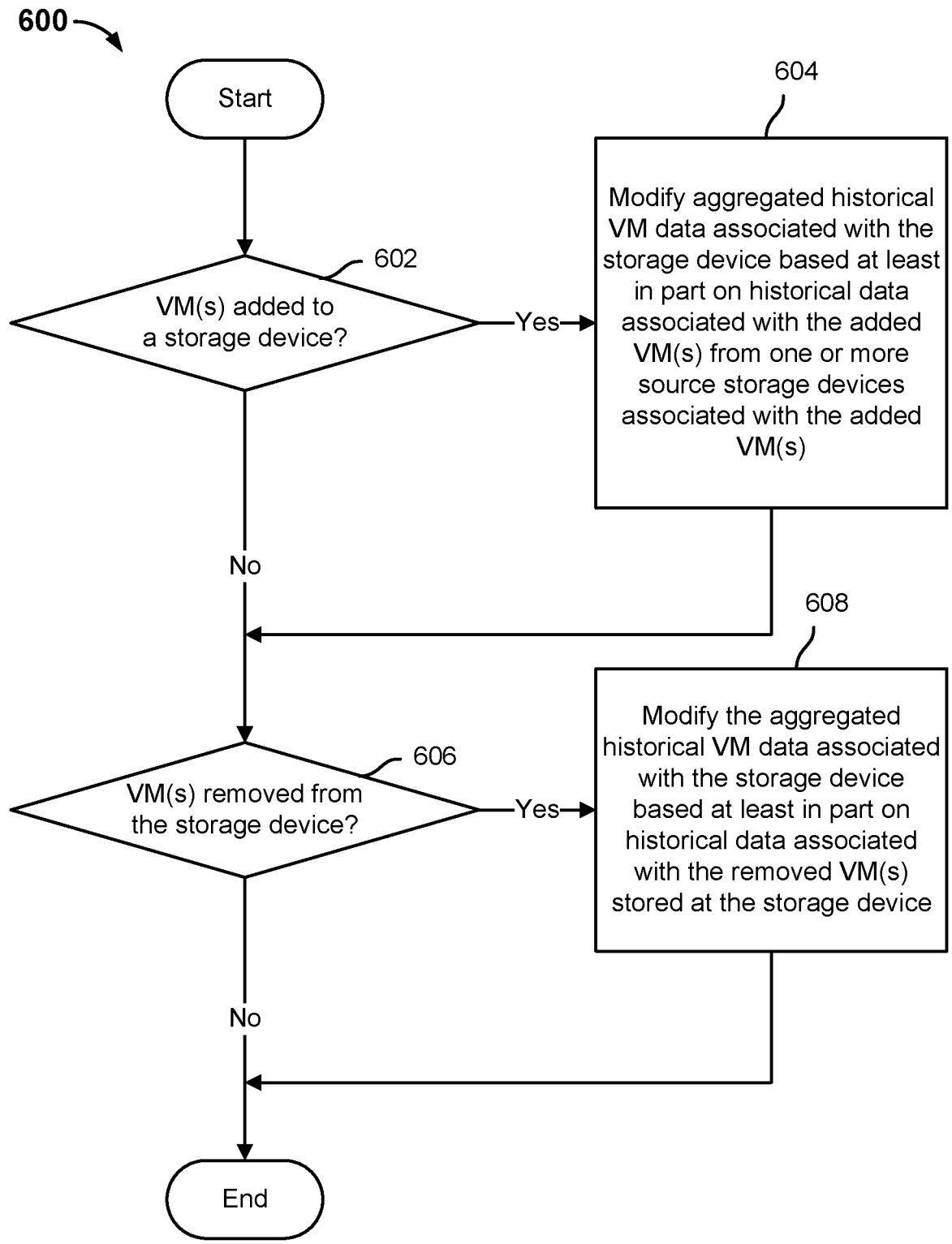
FIG. 6 is a flow diagram showing an embodiment of a process for determining the effective historical VM data at a storage device.

FIG. 6 is a flow diagram showing an embodiment of a process for determining the effective historical VM data at a storage device. In some embodiments, process 600 is implemented by VM load balancing server 112 of system 100 of FIG. 1.

In some embodiments, process 600 is performed subsequent to the completion of migrating one or more VMs within a pool in response to a user approval of a recommendation and/or prior to generating predicted metrics in a load balancing process across a pool at a particular storage device of the pool. For example, a recommendation was presented to a user to move VM(s) from a first storage device to a second storage device within a pool, and the user approved the recommendation. As a result of the user approving the recommendation, the VM(s) included in the recommendation were moved to their respective destination storage device that was identified in the recommendation. After the VMs were moved, the resource usage on the source storage device goes down, and usage on the destination storage device goes up. But, if these changes are not taken into account in making subsequent predicted metrics at either or both of the source and destination storage devices, then the original problem (e.g., a lack of storage space) may still appear to exist on the source storage device, and the destination storage device may appear to have more available storage space than it actually is. As such, a process such as process 600 is used, in various embodiments, so that metric predictions may be computed on the "effective" history of a storage device, with the effects of completed VM storage migration(s) taken into account. As will be described in further detail with process 600, the effective historical VM data at a storage device is determined by:

Subtracting out the (e.g., accesses in flash, space usage) contributions of the moved VM from every historical data point (e.g., within a configured window of time in the past) prior to its move from the source storage device.

Adding in the (e.g., accesses in flash, space usage) contributions of the moved VM to every data historical data point (e.g., within a configured window of time in the past) prior to its move on the destination storage device.

Then, for example, the trend and variability of the space usage on the destination storage device of the moved VM may be incorporated into future predictions.

At 602, it is determined if VM(s) have been added to a storage device. In the event that VM(s) have been added to the storage device, control is transferred to 604. Otherwise, in the event that no VM(s) have been added to the storage device, control is transferred to 606. At 602, the storage device for which process 600 is performed is a destination storage device for the newly added VM(s). VM(s) may have been added by a VM migration (e.g., that resulted from a user approval of a VM load balancing recommendation).

At 604, aggregated historical VM data associated with the storage device is modified based at least in part on historical data associated with the added VM(s) from one or more source storage devices associated with the added VM(s). Historical data (e.g., space usage, access rate, and/or load) associated with each added VM is obtained from the source storage device from which that VM was moved from and then added to the aggregated historical VM data that is stored at the storage device. In some embodiments, certain types of data obtained for added VM(s) may be transformed/scaled (e.g., based on an attribute of the storage device such as its deduplication capabilities relative to that of the source storage device, based on a different time scale at which the data was recorded at the source storage device relative to the time scale at which data is stored at the destination storage device) prior to being added at the destination storage device.

At 606, it is determined if VM(s) have been removed from the storage device. In the event that VM(s) have been removed from the storage device, control is transferred to 608. Otherwise, in the event that no VM(s) have been removed from the storage device, process 600 ends. At 606, the storage device for which process 600 is performed is a source storage device for the removed VM(s). VM(s) may have been removed by a VM migration (e.g., that resulted from a user approval of a VM load balancing recommendation).

At 608, aggregated historical VM data associated with the storage device is modified based at least in part on historical data associated with the removed VM(s) stored at the storage device. Historical data (e.g., space usage, access rate, and/or load) associated with each removed VM that was stored at the storage device is excluded from the determination of aggregated effective historical VM data associated with the storage device. In some embodiments, the historical data of the removed VMs is discarded. In some embodiments, the historical data of the removed VMs is retained but indicated to not be included in the aggregated effective historical VM data.

Figure 7:
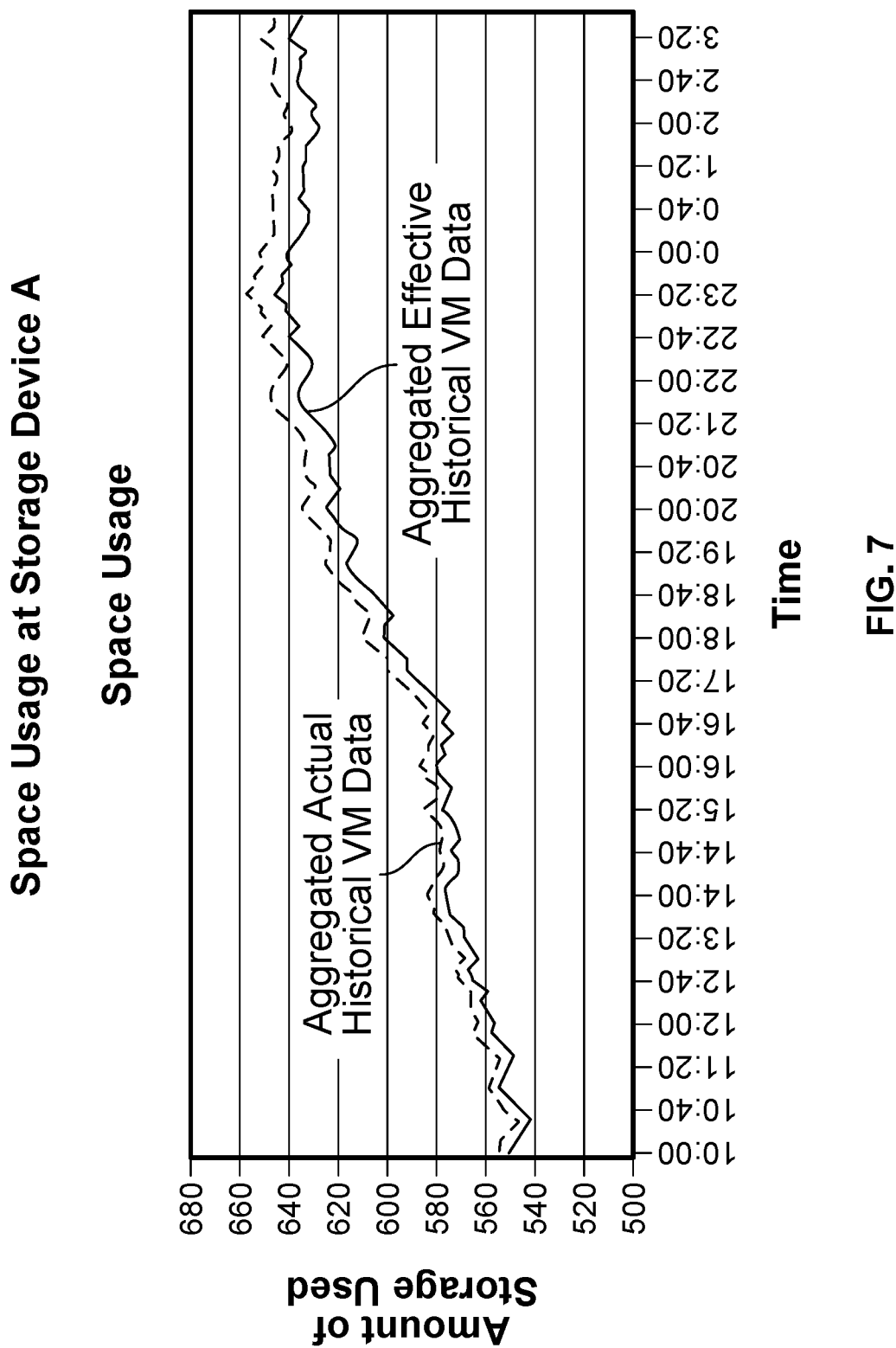
FIG. 7 is a diagram showing an example of comparing an aggregated actual historical VM data plot with an aggregated effective historical VM data plot at Storage Device A.

FIG. 7 is a diagram showing an example of comparing an aggregated actual historical VM data plot with an aggregated effective historical VM data plot at Storage Device A. The top plot shows the aggregated actual historical VM space usage data that is stored at Storage Device A across different points in time before accounting for the migration of one or more VMs off of Storage Device A. The bottom plot shows the aggregated effective historical VM space usage data that is stored at Storage Device A after accounting for the migration of one or more VMs off of Storage Device A. As such, the aggregated effective historical VM space usage data shows less space usage data at each time point because the space usage contributions of one or more VMs have been removed from each time point.

Some of these historical VM data must be approximated since the complete component-wise statistical breakdown may not be stored in some embodiments. In some embodiments, only the deltas against the source and destination storage devices are stored as storing deltas is more efficient than copying the data and applying the delta. Deltas may be easily removed or adjusted in the case that it is the cause of problems. Deltas are also easier to check against the actual historical VM data.

In some embodiments, when a new performance data point (e.g., of space usage) is generated (e.g., at a predetermined interval), the "effective history" table does not need to be altered.

FIG. 8 is an example of a storage device specific predicted metric data structure. In the example of FIG. 8, the data structure comprises vector 800 that stores 13 predicted metrics that were generated for a particular storage device using the storage device's aggregated effective historical VM data. In some embodiments, vector 800 is generated using a process such as process 500 of FIG. 5. The predicted metrics were stored in vector 800 at positions/elements that correspond to the respective priority associated with their metric type. For example, space usage related metric 1 is the metric type that is associated with the highest priority and is therefore the first element in vector 800. Load related metric 13 is the metric type that is associated with the lowest priority and is therefore the last element in vector 800. Predicted metrics corresponding to metric types of other priorities are inserted into vector 800 at corresponding positions/elements in between the first and the last elements, where the priority level of a metric type is denoted by a value from 0 to 12, where 0 indicates the highest priority and 12 indicates the lowest priority. In some embodiments, the combined predicted metrics use lexicographic (i.e., strict) ordering.

Table 3 below includes example metric types that are included in vector 800:

TABLE 3

| Priority (High to Low) | Metric Type | Metric Name | Brief Description |
|---|---|---|---|
| 0 | Space usage related Metric 1 | space_threshold_100 | Probability of a storage space running out of space (e.g., 100% storage space used). |
| 1 | Space usage related Metric 2 | space_threshold_snapshots | Probability of storage device ceasing to take snapshots (e.g., that 98% of storage space used). |
| 2 | Space usage related Metric 3 | space_threshold_replicas | Probability of storage device ceasing to accept replicas (e.g., that 95% of storage space used). |
| 3 | Protection policy violated Metric 4 | protection_policy_violated | Percentage of VMs whose protection policy cannot be maintained. |
| 4 | QoS related Metric 5 | qos_overcommit | Guaranteed QoS is overcommitted. |
| 5 | Access rate related Metric 6 | flash_overcommit_97 | Flash hit rate falls below 97% over the week. |
| 6 | Access rate related Metric 7 | flash_overcommit_99 | Flash hit rate falls below 99% over the week. |
| 7 | Load related Metric 8 | load_overcommit_80 | Percentage in next week that combined read/write load is above 80% of the storage device's capacity. |
| 8 | Load related Metric 9 | load_overcommit_60 | Percentage in next week that combined read/write load is above 60% of the storage device's capacity. |
| 9 | Space usage related Metric 10 | space_threshold_90 | Probability that the storage device goes over 90% full, triggering an alert. |
| 10 | Access rate related Metric 11 | flash_overcommit_999 | Flash hit rate falls below 99.9% over the week. |
| 11 | Space usage related Metric 12 | space_threshold_80 | Probability that the storage device goes over 80% full. |
| 12 | Load related Metric 13 | load_overcommit_40 | Percentage in next week that combined read/write load is above 40% of storage device capacity. |

The protection policy violated metric (Protection policy related Metric 4, above) is the percentage of VMs that will encounter a policy error when moved. The VM load balancing server should look at the replication policy attached to the VMs to be moved. If they are configured to replicate, and the destination storage device:

Does not have a replication license,

Does not have a replication link to the correct destination, or

Is the target of replication

Then that VM would be in a policy error state after migration. Other policy errors are possible, such as failure to apply the policy, for example.

This protection policy violated metric does not need to take existing policy errors into account. In some embodiments, it is not a "problem" metric that the VM load balancing server tries to improve. Instead, the VM load balancing server attempts to avoid making it worse.

In the example prioritization of metric types that is shown in Table 3, critical space problems (e.g., probability that either 100% or 98% or more of the storage space will be consumed) are prioritized highest. This is even more important than maintaining replication (e.g., which may take place unless 95% or more of the storage space will be consumed), in some embodiments. The other problems are all performance-related and must not break replication policies. A storage device that has lots of performance left but if cannot replicate it is not a good target for a VM that is being protected by replication. Flash misses also make big impacts on latency and so are issues to be addressed. 110 load also causes latency and is important to be addressed. The last few metric types will first ensure that no system hits the space threshold (if all of the above can also be satisfied), then work to optimize flash, then spread 110 load.

Figure 9:
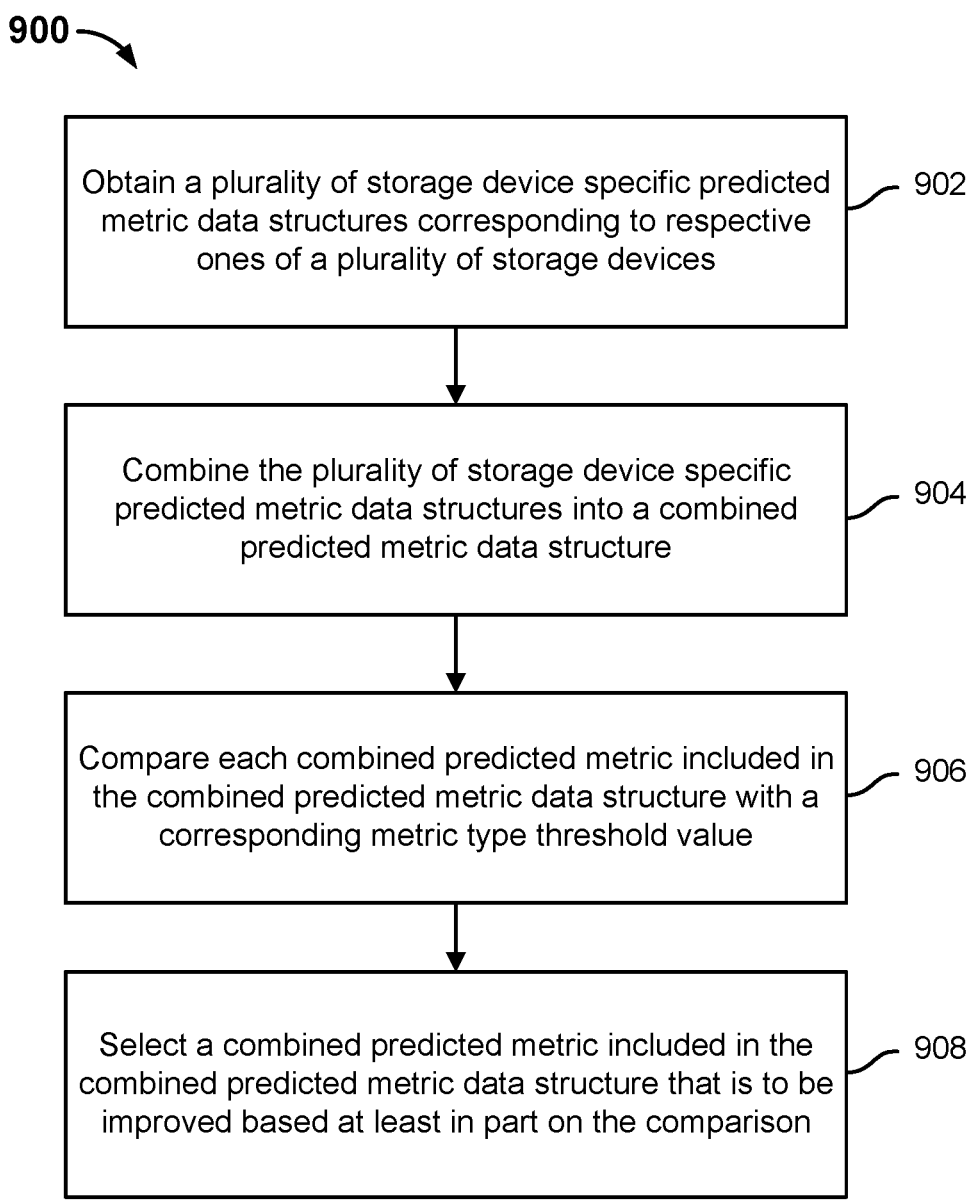
FIG. 9 is a flow diagram showing an embodiment of a process for determining a combined, pool-level predicted data structure.

FIG. 9 is a flow diagram showing an embodiment of a process for determining a combined, pool-level predicted data structure. In some embodiments, process 900 is implemented by VM load balancing server 112 of system 100 of FIG. 1. In some embodiments, step 404 of process 400 of FIG. 4 may be implemented using process 900.

At 902, a plurality of storage device specific predicted metric data structures corresponding to respective ones of a plurality of storage devices is obtained. In some embodiments, a process such as process 500 is implemented to obtain a storage device specific predicted metric data structure (e.g., vector 800 of FIG. 8) for each storage device that belongs to a pool of storage devices.

At 904, the plurality of storage device specific predicted metric data structures is combined into a combined predicted metric data structure. The combined predicted metric across the predicted metrics associated with the same metric type from each storage device specific data structure is the probability that the pool, as a whole, will encounter the undesirable event (e.g., reaching 100% of space usage) associated with the metric type. In various embodiments, the storage device specific predicted metric data structures are combined to form a combined, pool-level predicted metric data structure by determining a joint probability across the predicted metrics associated with the same metric type from each storage device specific data structure.

For example, there are n storage devices in a pool, P1 is the predicted metric (probability) that Storage Device 1's space usage is going to reach 100% storage capacity, P2 is the predicted metric (probability) that Storage Device 2's space usage is going to reach 100% storage capacity, . . . and Pn is the predicted metric (probability) that Storage Device n's space usage is going to reach 100% storage capacity. As such, (1−P1) is the probability that Storage Device 1's space usage is not going to reach 100% storage capacity, (1−P2) is the probability that Storage Device 2's space usage is not going to reach 100% storage capacity, . . . and (1−Pn) is the probability that Storage Device n's space usage is not going to reach 100% storage capacity. Therefore, the joint probability that at least one storage device in the pool's space usage is going to reach 100% storage capacity is:

$$1-(1-P1)(1-P2) \ldots (1-Pn) \quad (1)$$

Formula (1) indicates that a change in even one of the predicted metrics (e.g., if the predicted metric (probability) that a storage device's will reach 100% storage capacity lowers) will improve the combined, pool-level predicted metric.

In the event that a predicted metric comprises a range of probabilities (instead of a single probability value), the joint probability for predicted metrics of storage devices of a pool may be computed as follows: compute a first joint probability of all the upper limits of the predicted metrics and a separate, second joint probability of all the lower limits of the predicted metrics and use the first and second joint probabilities as the endpoints of the combined predicted metric.

In some embodiments, bounding the storage device specific predicted metrics probabilities below 0.99 ensures that the combined, pool-level probability does not saturate at 1.0. For example, in a 10 storage device pool with five storage devices at a threshold and five below the threshold, the calculated value would be:

$$1-(1-0.99)^5(1-0.01)^5=0.99999999990490099501$$

So if a change increases the probability on one of the storage devices to 0.02, there is a detectable difference:

$$1-(1-0.99)^5(1-0.01)^4(1-0.02)=\\0.99999999990586159102$$

That is, even with some storage devices above the threshold, causing others to breach it is still worse.

In some embodiments, each combined predicted metric is stored in the format of 1−c format, where c is (1−P1) (1−P2) . . . (1−Pn) to maintain more precision in the combined predicted metric.

At 906, each combined predicted metric included in the combined predicted metric data structure is compared with a corresponding metric type threshold value.

In various embodiments, each combined predicted metric is compared to a predetermined threshold value corresponding to its metric type. For example, the combined predicted metric for reaching 100% of storage capacity at one or more VMs is compared against the predetermined threshold value for reaching 100% of storage capacity.

An example predetermined threshold value for any of the combined predicted space usage related metric types is 0% because no chance of running out of space is acceptable.

An example predetermined threshold value for any of the combined predicted load related metric types is 1% because some heavy load may be acceptable (e.g., a few hours per week).

A predetermined threshold value may be selected for each of the combined predicted access rate related metric types. For example, the combined 97% flash hit rate metric has a corresponding predetermined threshold of 3% misses, the combined 99% flash hit rate metric has a corresponding predetermined threshold of 1% misses, and the combined 99.9% flash hit rate metric has a corresponding predetermined threshold of 0.1% misses.

The values of predetermined thresholds could be made higher to reduce the number of recommendations, in case they are too noisy or are perceived as only solving lower-probability events.

At 908, a combined predicted metric included in the combined predicted metric data structure that is to be improved is selected based at least in part on the comparison.

A combined, pool-level predicted metric that exceeds a corresponding predetermined threshold value is determined to be a "problem" metric and one that the VM load balancing server will attempt to improve via recommending one or more VMs to be migrated among storage devices within the pool, as will be described in further detail below.

Figure 10:
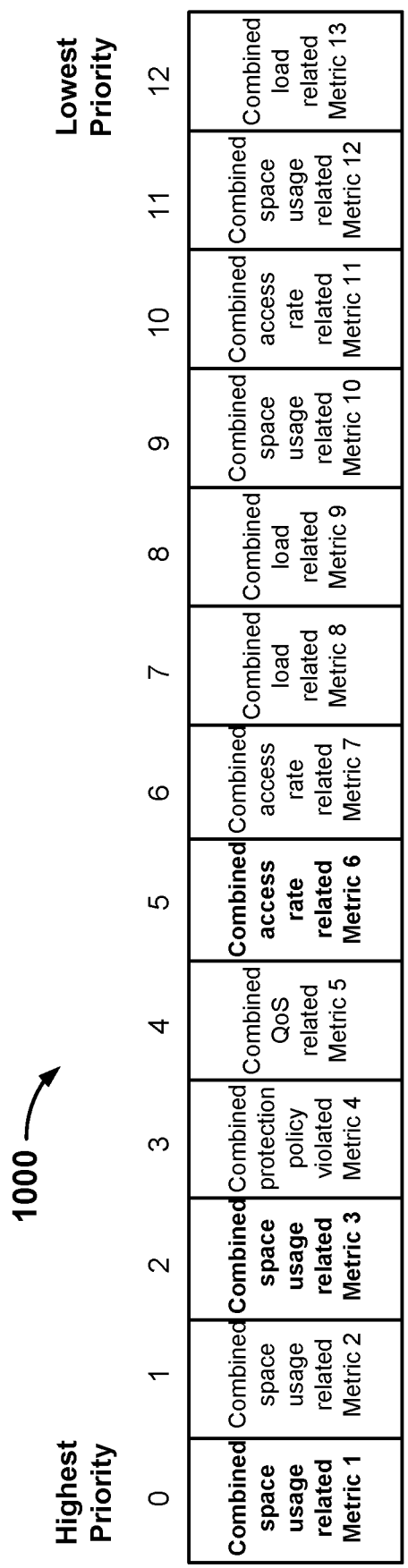
FIG. 10 is a diagram showing a combined predicted metric data structure.

FIG. 10 is a diagram showing a combined predicted metric data structure. In the example of FIG. 10, the combined predicted metric data structure is combined predicted metric vector 1000. Each combined predicted metric of combined predicted metric vector 1000 that is selected to be improved (e.g., having a combined predicted metric that is greater than a corresponding threshold value) is shown in bolded text. As such, in the example of FIG. 10, the combined space usage related metric 1, combined space usage related metric 3, and combined access rate related metric 6 are each determined to be improved and therefore, selected to be used to determine and recommend which VMs to migrate among storage devices of the pool. An example processing for improving a combined, pool-level predicted data structure is described in FIG. 11, below. In some embodiments, in the event that there are multiple selected combined predicted metrics to be improved, then VMs are selected to be migrated among a pool of storage devices for each selected combined predicted metric, starting with the one corresponding to the metric type of the highest priority and proceeding to each other of the selected combined predicted metrics in the order of their descending priorities.

Figure 11:
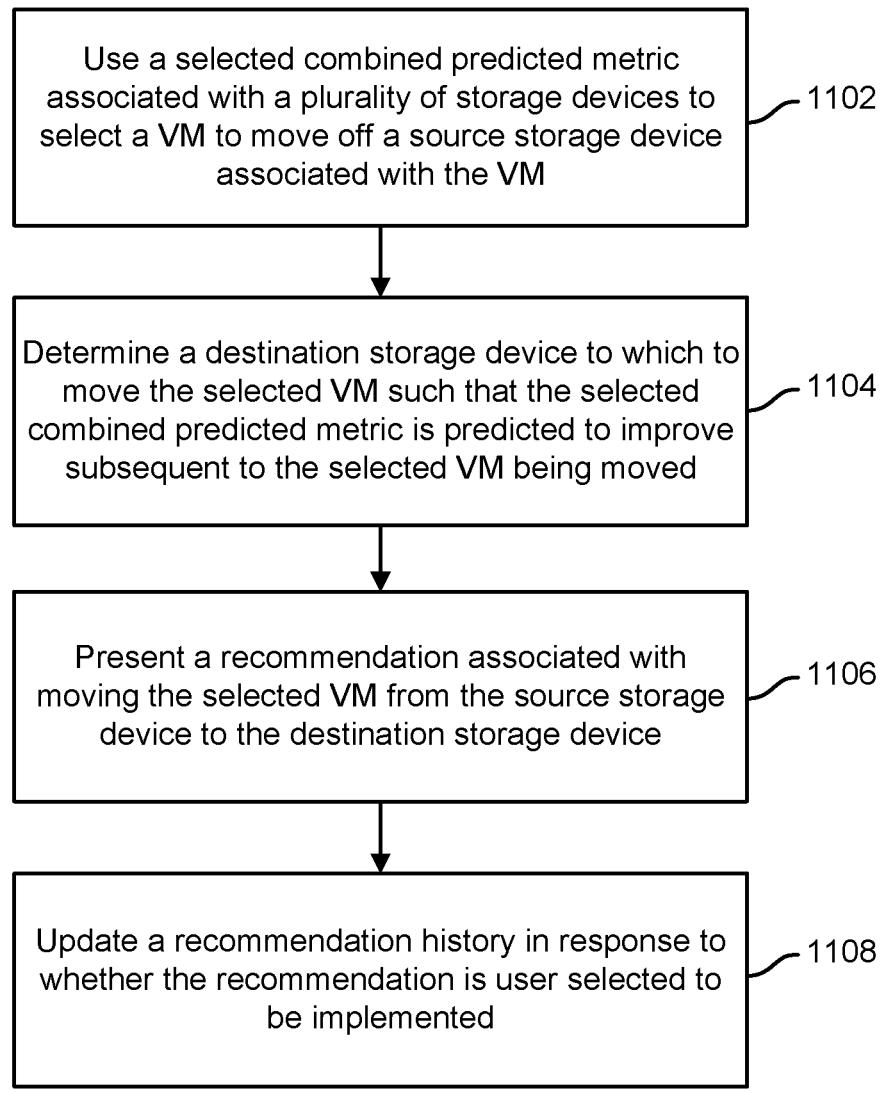
FIG. 11 is a flow diagram showing an example process for determining a combined, pool-level predicted data structure.

FIG. 11 is a flow diagram showing an example process for determining a combined, pool-level predicted data structure. In some embodiments, process 1100 is implemented by VM load balancing server 112 of system 100 of FIG. 1.

In some embodiments, process 1100 is repeated for each selected combined predicted metric.

At 1102, a selected combined predicted metric associated with a plurality of storage devices is used to select a VM to move off a source storage device associated with the VM. A selected combined predicted metric for a pool of storage devices is used to select one or more candidate sets of VMs to move off of their current source storage devices. In some embodiments, a candidate set of VMs to move off their current source storage device(s) is selected for the selected combined predicted metric if it is determined that in a hypothetical (what-if) scenario, that after the candidate set of VMs is moved off their current source storage device(s), the updated combined predicted metric that is computed for the corresponding metric type is improved (e.g., the probability of reaching the undesirable event associated with the metric type is lowered). For example, if the selected combined space usage related metric was a 90% probability that at least one storage device in the pool is going to reach 100% space usage, then a candidate set of VMs may be selected such that if such a set of VMs were removed from their current storage devices (without taking into consideration which destination storage device(s) they would be moved to), the probability that at least one storage device in the pool is going to reach 100% space usage is going to be lower (e.g., by a statistically significant amount) than 90%. An example process of selecting candidate sets of VMs for each selected combined predicted metric is described in FIG. 12, below.

At 1104, a destination storage device to which to move the selected VM is determined such that the selected combined predicted metric is predicted to improve subsequent to the selected VM being moved. In some embodiments, it is determined which destination storage device a set of VMs to which a selected set of VMs is to be migrated based on constraints associated with user assigned rules, constraints associated with storage device attributes, and which destination storage device is predicted to improve the combined predicted metric vector the most, with respect to the metric types of the highest priorities. An example process of determining which destination storage device to move a selected set of VMs is described in FIG. 13, below.

In some embodiments, it is acceptable to make combined predicted metrics lower on the priority list worse in order to improve combined predicted metrics higher on the priority list. In some embodiments, it also acceptable to bound a particular level of service as "good enough" so that items further down the list can be optimized.

In some embodiments, recommendations should take into account the cost of moving VMs both in network traffic and disruption to the users. If an equally good result can be satisfied by moving VMs which are smaller, less I/O-intensive, or powered off, the recommendation generation process should identify the optimal set of VMs to move.

In some embodiments, if the projected costs of moving VMs exceed the potential benefit, no recommendation should be provided.

In some systems, the number of concurrent storage migration operations per storage device is limited, and this limit should be respected. The VM load balancing server should seek to identify VMs that span multiple storage devices and multiple destination storage devices in order to spread load.

In some embodiments, the recommendation modelling should estimate the effects of moving VMs between storage devices which compress for capacity and those which do not, and between flash (which dedupe for capacity) and hybrid models (which do not dedupe for capacity).

Two storage devices may not be anywhere close to a space usage threshold and yet one is more "full" than the other, either in load or capacity. In various embodiments, VM load balancing goals in this case are:

Get "ahead of the game" by using empty storage devices in preference to fuller storage devices. Avoid moving a VM on a storage device only to have to move it off a few weeks later, or leaving an empty storage device unused.

Preserve some open space for initial placement.

Allow moving beyond perfectly balancing space in order to balance load as well.

If one potential target has 25% capacity and 10% load used, and another has 20% capacity and 20% load, then it is noted that the difference in capacity is smaller than the difference in load, so load should dominate.

In some embodiments, a new metric that combines the two measurements may be added to the combined predicted metric data structure. For example, one possible solution is to sum 1/(1−capacity percentage)+1/(1−load percentage) across all storage devices. This prioritizes increasingly low percentages. In some embodiments, combined predicted metrics are ignored and VMs are stochastically distributed in a way that tends to promote balance. In the example above, several VMs may need to be moved but not all of them should be put on the same storage device. Each storage device could instead be assigned a weight based on predicted capacity and load, and in case the combined predicted metric is tied, randomly choose a destination storage device proportional to those weightings.

At 1106, a recommendation associated with moving the selected VM from the source storage device to the destination storage device is presented. A recommendation that identifies at least the selected set of VMs to move, the destination storage device to which to move the set of VMs, and the combined predicted metric (e.g., associated with the highest priority) that is predicted to be improved after the move is generated and presented at a user interface. A user may select to implement the recommendation or ignore the recommendation and/or provide a reason for his or her action.

Any VM selected as part of the recommendation must improve at least one of the selected combined predicted metrics to improve. The combined predicted metrics that were not selected to be improved only inform VM and storage device choice and in some embodiments, these metrics will not be visible to the user.

At 1108, a recommendation history is updated in response to whether the recommend is user selected to be implemented. Whether the recommendation was approved by a user to be implemented is stored in the recommendation and may be used to determine subsequent recommendations.

In some embodiments, the VM load balancing server is configured to self-measure the accuracy and impact of its predictions. If a prediction is made for the expected space consumption, IOPS, or flash usage on a storage device and no load balancing actions are taken, those predictions can be checked (e.g., updated based on newly available historical data) over the next week. If a load-balancing operation is performed based on a prediction of post-migration behavior, then the prediction associated with that load-balancing operation can also be checked. In various embodiments, the results of this self-analysis would feed back to the user in the form of a "confidence level" in subsequent predictions. In some embodiments, some or all of this information is sent back to the user at the user interface, in the form of predictive model output or retrospective analysis of recommendations.

Figure 12:
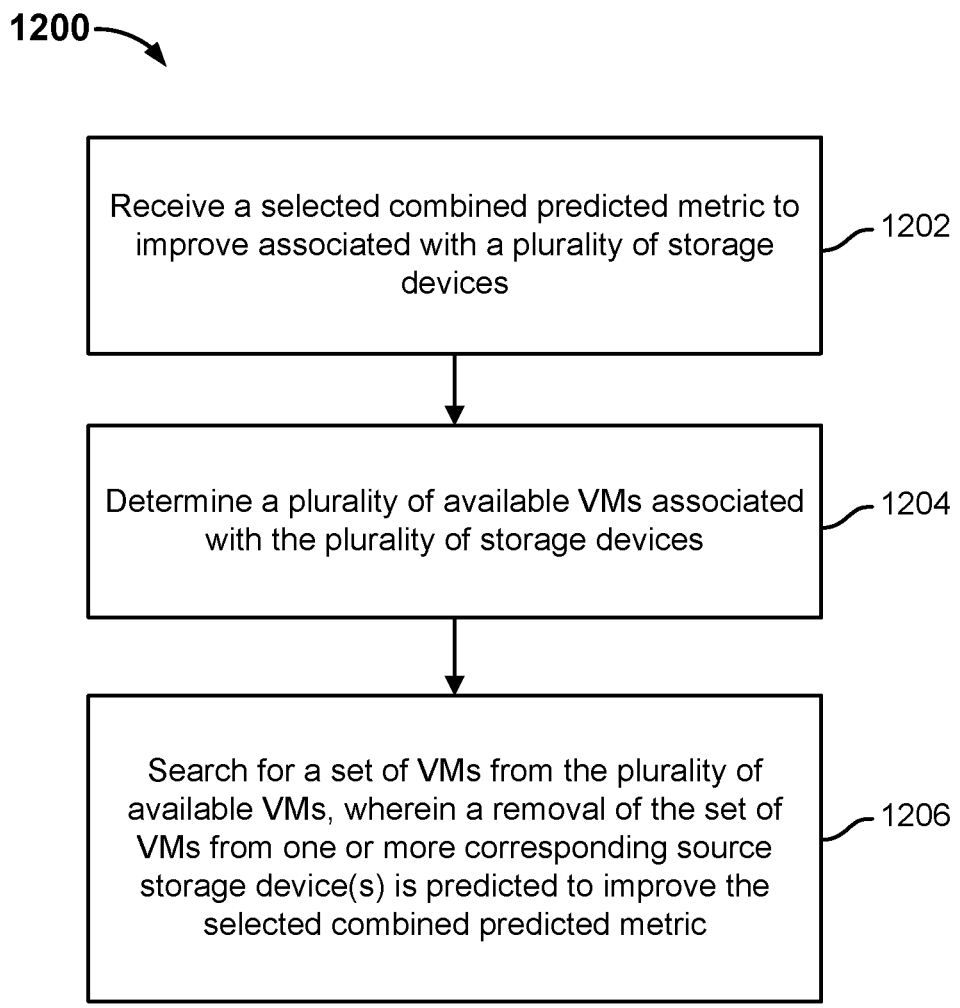
FIG. 12 is a flow diagram showing an example process for selecting a set of VMs to migrate off their source storage devices for a selected combined predicted metric.

FIG. 12 is a flow diagram showing an example process for selecting a set of VMs to migrate off their source storage devices for a selected combined predicted metric. In some embodiments, process 1200 is implemented by VM load balancing server 112 of system 100 of FIG. 1. In some embodiments, step 1102 of process 1100 of FIG. 11 may be implemented at least in part using process 1200.

At 1202, a selected combined predicted metric to improve associated with a plurality of storage devices is received. Process 1200 may be performed for each selected combined predicted metric to improve that is associated with a pool of storage devices. For example, returning to the example of FIG. 10, any one of combined space usage related metric 1, combined space usage related metric 3, and combined access rate related metric 6 may be received at 1202.

At 1204, a plurality of available VMs associated with the plurality of storage devices is determined. In various embodiments, the available VMs of the pool are those VMs that are not restricted from being migrated from their current storage devices. In some embodiments, restrictions on a VM from being migrated from their current storage device include user provided rules, the inclusion of the VM in a previously generated recommendation (e.g., the VM has already been committed to migrate to a determined destination storage device in the previously generated recommendation), and storage device attributes. For example, a user provided rule is that "VM-123" is to always run on Storage Device A or that no VM should be moved from a datastore at one subdirectory to a datastore with a different subdirectory. For example, a previously generated recommendation that was determined for combined predicted space usage related metric 1 includes moving "VM-123" to Storage Device D and as such, "VM-123" is no longer available when determining sets of VMs to migrate for combined predicted space usage related metric 3.

At 1206, a set of VMs from the plurality of available VMs is searched for, wherein a removal of the set of VMs from one or more corresponding source storage device(s) is predicted to improve the selected combined predicted metric. In some embodiments, of the available VMs, sets of one or more VMs are determined such that it in a hypothetical (what-if) scenario in which each VM of a set is removed (i.e., the historical VM data of that VM is removed) from their respective source storage devices, the recomputed combined, pool-level predicted metric data structure will include an updated combined predicted metric associated with the metric type of the selected combined predicted metric that is received at step 1202 that is better than the selected combined predicted metric received at step 1202. Computing the updated combined, pool-level predicted metric data structure may be determined using a process such as process 400 of FIG. 4. For example, if the selected combined predicted metric is a 90% probability that at least one storage device will reach 100% space usage (e.g., in the next seven days) and it is predicted that if both VMs "VM-123" and "VM-456" are moved off their current storage device (Storage Device B), there will only be a 70% probability that at least one storage device will reach 100% space usage, then VMs "VM-123" and "VM-456" will be determined to be a set of VMs at step 1206.

Figure 13:
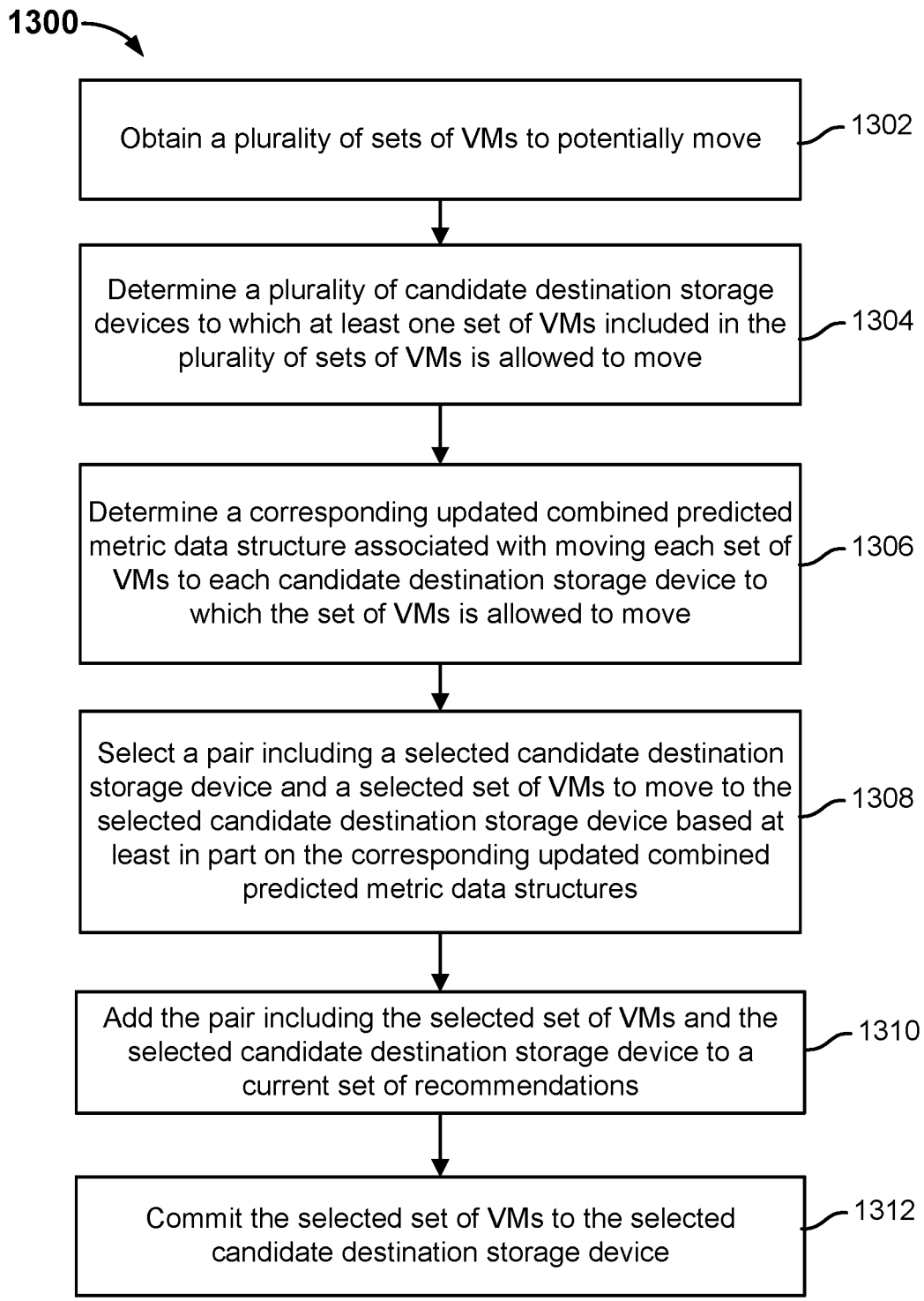
FIG. 13 is a flow diagram showing an example process for selecting a candidate destination storage device to which to recommend moving a set of VMs.

FIG. 13 is a flow diagram showing an example process for selecting a candidate destination storage device to which to recommend moving a set of VMs. In some embodiments, process 1300 is implemented by VM load balancing server 112 of system 100 of FIG. 1. In some embodiments, step 1104 of process 1100 of FIG. 11 may be implemented at least in part using process 1300.

Process 1300 describes an example process of selecting a candidate destination storage device to move a selected set of VMs to, to improve a current, selected combined predicted metric associated with a pool of storage devices. As will be described below, pairs of sets of VMs and candidate destination storage devices are looped over at the same time, and the pair of the set of VMs and the corresponding candidate destination storage device that is associated with the best updated combined predicted metric data structure is selected.

At 1302, a plurality of sets of VMs to potentially move is obtained. In some embodiments, each set of VMs may be determined for the current, selected combined predicted metric by a technique such as step 1206 of process 1200 of FIG. 12.

For example, sets of VMs Set A, Set B, and Set C are generated.

At 1304, a plurality of candidate destination storage devices to which at least one set of VMs included in the plurality of sets of VMs is allowed to move is determined. In various embodiments, a candidate destination storage device comprises a storage device within the pool of storage devices to which all VM of at least one set of VMs is permitted to (e.g., based on stored affinity rules) move. In some embodiments, all of the VMs in a set are to be moved to the same destination storage device.

Returning to the example above, destination candidate storage devices included in the pool of storage devices D1, D2, and D3 are determined because at least one of sets of VMs Set A, Set B, and Set C is permitted to move to each of D1, D2, and D3.

At 1306, a corresponding updated combined predicted metric data structure associated with moving each set of VMs to each candidate destination storage device to which the set of VMs is allowed to move is determined. For each combination or pair of a set of VMs and a candidate destination storage device, a hypothetical (what-if) scenario is generated in which that particular set of VMs is removed from their corresponding source storage devices (e.g., the VMs of the candidate sets may reside on the same or different source storage devices) and then migrated to that particular candidate destination storage device. In each hypothetical (what-if) scenario, the historical data of each VM of that set is removed from their corresponding source storage devices and then added to that particular candidate destination storage device. In each hypothetical (what-if) scenario, an updated combined, pool-level predicted metric data structure is computed for that pair of a set of VMs and a candidate destination storage device based on the hypothetical migration of the set of VMs. Computing the updated combined, pool-level predicted metric data structure may be determined using a process such as process 400 of FIG. 4.

Returning to the example above, an updated combined, pool-level predicted metric data structure may be determined for each of the following eight pairs of a set of VMs and a candidate destination storage device (that the set of VMs is permitted to move to):

Set A moves to D1
Set A moves to D2
Set A moves to D3
Set B moves to D1
Set B moves to D2
Set B moves to D3
Set C moves to D2 (in this example, Set C is not permitted to move to D1)
Set C moves to D3

At 1308, a pair including a selected candidate destination storage device and a selected set of VMs to move to the selected candidate destination storage device to is selected based at least in part on the corresponding updated combined predicted metric data structures. In various embodiments, the pair of the set of VMs and the corresponding candidate destination storage device that yields the best (e.g., lowest probability) combined predicted metric corresponding to the highest priority is selected as the most desirable pair of selected candidate destination storage device and the selected set of VMs to move that selected candidate destination storage device to be recommended. In the event that there are two or more tied pairs of sets of VMs and corresponding candidate destination storage devices (e.g., candidate destination storage devices for which the respective updated combined predicted metric data structures are tied), then one or more tiebreaker rules may be used to select one of the pairs of a set of VMs and corresponding candidate destination storage devices. For example, a tiebreaker rule may dictate to select the pair of a set of VMs and the corresponding candidate destination storage device that either has the most remaining storage usage and/or the candidate destination storage device for which the least amount of bytes will be required to be moved.

Returning to the example above, of the eight evaluated potential moves of sets of VMs, moving Set B to storage device D2 is determined to yield the updated combined predicted metric data structure that includes the moved improved (best) combined predicted metric associated with the highest priority.

At 1310, the pair including the selected set of VMs and the selected candidate destination storage device is added to a current set of recommendations.

At 1312, the selected set of VMs is committed to the selected candidate destination storage device. Committing the candidate set of VMs to the selected candidate destination storage device includes preventing any VM of the candidate set from being included in a subsequently generated recommendation. As such, in some embodiments, subsequently generated recommendations do not include overlapping VMs as previously generated recommendations.

In some embodiments, a pair of a set of VMs and a corresponding candidate destination storage device cannot be selected if the proposed move makes a higher-priority combined predicted metric worse, even if it improves the current, selected combined predicted metric. In the event that none of the combinations of sets of VMs and corresponding candidate destination storage devices is satisfactory, no recommendation will be made to move any set of VMs to a corresponding candidate destination storage device for the current, selected combined predicted metric to improve.

In some embodiments, only recommendations associated with improving the worst (i.e., highest-priority) of the combined predicted metrics that were selected to be improved are presented to a user, even if the recommendations improve some of the lower priority combined predicted metrics as well.

In Examples 1 through 6 described below, Storage Device [x] refers to the source storage device from which one or more VM(s) are recommended to move off and Storage Device [y] refers to the destination storage device to which the one or more VM(s) are recommended to move. While Examples 1-6 below do not show the set of VMs that is suggested to move from the source (Storage Device [x]) to the destination (Storage Device [y]), in practice, the suggested VM(s) to move may be presented with the recommendation at the same or a different user interface. For example, in some instances, a single user interface may describe the following for each recommendation:

a) What issues were detected (what problem metrics exist on which storage device(s))?

b) Which VMs will be moved (and a source and destination for each VM)?

c) What will be the predicted outcome after successful migration?

Example 1

| | |
|---|---|
| Combined Predicted Metric Type | space_threshold_100 |
| Explanation for VM Migration | Storage Device [x] has a [p] % chance of running out of space within the next week. This will cause VMs running on this storage device to fail due to SCSI write errors. |
| Backup Data | Storage Device [x] is currently [q] % full ([s] TiB). Its usage has been increasing [r] GiB/week. |
| If Fixed | Space usage on Storage Device [x] will decrease by [s] GiB. This will reduce the chance of running out of space to less than [p] %. |
| Destination Storage Device | Space usage on Storage Device [y] will increase by [s'] GiB subsequent to the VM migration. |

Example 2

| | |
|---|---|
| Combined Predicted Metric Type | space_threshold_98 |
| Explanation | Storage Device [x] has a [p] % chance of becoming 98% full within the next week. Once this level has been reached, the Storage Device will not permit any further snapshots to be taken. |
| Backup data | Storage Device [x] is currently [q] % full ([s] TiB). Its usage has been increasing [r] GiB/week. |
| If fixed | Space usage on Storage Device [x] will decrease by [s] GiB. This will reduce the chance of missing snapshots to less than [p] % |
| Destination Storage Device | Space usage on Storage Device [y] will increase by [s'] GiB subsequent to the VM migration. |
| If violated | Space usage on Storage Device [x] will increase by [s] GiB. This will increase the chance of missing snapshot to [p] % |

Example 3

| | |
|---|---|
| Combined Predicted Metric Type | space_threshold_95 |
| Explanation | Storage Device [x] has a [p] % chance of becoming 95% full within the next week. Once this level has been reached, the Storage Device will not accept any additional replicated data. |
| Backup data | Storage Device [x] is currently [q] % full ([s] TiB). Its usage has been increasing [r] GiB/week. |
| If fixed | Space usage on Storage Device [x] will decrease by [s] GiB. This will reduce the chance of stopping replication to less than [p] % |
| Destination Storage Device | Space usage on Storage Device [y] will increase by [s'] GiB. |
| If violated | Space usage on Storage Device [x] will increase by [s] GiB. This will increase the chance of stopping replication to [p] % |

Example 4

| | |
|---|---|
| Combined Predicted Metric Type | space_threshold_90 |
| Explanation | Storage Device [x] has a [p] % chance of becoming 90% full within the next week. This level will trigger a capacity alert on the Storage Device. |
| Backup data | Storage Device [x] is currently [q] % full ([s] TiB). Its usage has been increasing [r] GiB/week. |
| If fixed | Space usage on Storage Device [x] will decrease by [s] GiB. This will reduce the chance of triggering an alert threshold [p] % |
| Destination Storage Device | Space usage on Storage Device [y] will increase by [s'] GiB. |
| If violated | Space usage on Storage Device [x] will increase by [s] GiB. This will increase the chance of a capacity alert to [p] % |

Example 5

| Combined Predicted | |
|---|---|
| Metric Type | protection_policy_violated |
| Explanation | n/a |
| Backup data | n/a |
| If fixed | n/a |
| If violated | [n] VMs moved to Storage Device [x] will no longer be able to replicate to their configured replication destination. |

Example 6

| Combined Predicted | |
|---|---|
| Metric Type | flash_overcommit_97, flash_overcommit_99 |
| Explanation | Storage Device [x] has experienced high latency this week, due to an average [p] % flash hit rate, which is below our 99% goal. |
| Backup data | Storage Device [x]'s miss rate ranged from [p] % to [q] %. During periods of high miss rate, VMs experienced [m] ms increased latency. |
| If fixed | Flash hit rate will increase to an average of [p] %, reducing latency due to disk reads by [m] ms. |
| If violated | The average flash hit rate on Storage Device [x] % will decrease to [p] %, increasing latency by about [m] ms. |

Another way of presenting recommendations is to group recommendations per-storage device instead of as a list of issues and outcomes, such as shown in Examples 1 through 6, above. The way in which the list of VMs is shown may not be altered based on the reasons for moving them, although there could be a column showing "space," "load," "flash," etc. as the reason for their movement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine a plurality of storage device specific predicted metric data structures corresponding to respective ones of a plurality of storage devices, wherein the plurality of storage device specific predicted metric data structures includes a first storage device specific predicted metric data structure corresponding to a first storage device and a second storage device specific predicted metric data structure corresponding to a second storage device, wherein the first storage device specific predicted metric data structure includes a first predicted metric corresponding to a metric type and the second storage device specific predicted metric data structure includes a second predicted metric corresponding to the metric type, wherein the metric type comprises a specified event;
combine the plurality of storage device specific predicted metric data structures corresponding to respective ones of the plurality of storage devices into a combined predicted metric data structure, wherein to combine the plurality of storage device specific predicted metric data structures comprises to determine a combined predicted metric corresponding to the metric type based at least in part on combining the first predicted metric and the second predicted metric, wherein the combined predicted metric corresponding to the metric type corresponds to a predicted probability that the specified event associated with the metric type will occur with respect to any storage device within the plurality of storage devices; and
use the combined predicted metric data structure to determine a virtual machine (VM) to move from the first storage device included in the plurality of storage devices to the second storage device included in the plurality of storage devices to potentially improve at least a portion of the combined predicted metric data structure; and
a memory coupled to the processor and configured to provide the processor with instructions.

2. The system of claim 1, wherein the processor is configured to receive user selections of one or more storage devices to include in the plurality of storage devices.

3. The system of claim 1, wherein the processor is configured to:
determine for the first storage device a plurality of predicted metrics corresponding to respective ones of a plurality of metric types based at least in part on aggregated effective historical VM data stored at the first storage device; and
include the plurality of predicted metrics into the first storage device specific predicted metric data structure corresponding to the first storage device.

4. The system of claim 3, wherein the processor is further configured to:
determine the aggregated effective historical VM data stored at the first storage device based at least in part on adding to aggregated historical VM data storage at the first storage device historical data associated with an added VM from a source storage device associated with the added VM.

5. The system of claim 3, wherein the processor is further configured to:
determine the aggregated effective historical VM data stored at the first storage device based at least in part on subtracting historical data associated with a removed VM from aggregated historical VM data storage at the first storage device.

6. The system of claim 1, wherein the combined predicted metric data structure includes a plurality of combined predicted metrics, wherein the plurality of combined predicted metrics corresponds to respective ones of a plurality of priorities.

7. The system of claim 1, wherein the processor is further configured to select a combined predicted metric to improve from the combined predicted metric data structure.

8. The system of claim 7, wherein the combined predicted metric data structure includes a plurality of combined predicted metrics and wherein the processor is further configured to:
compare each of at least a subset of the plurality of combined predicted metrics with a corresponding metric type threshold value; and
select the combined predicted metric included in the combined predicted metric data structure that is to be improved based at least in part on the comparison.

9. The system of claim 7, wherein the processor is further configured to:
- use the selected combined predicted metric to select the VM to move off the first storage device;
- determine the second storage device as a destination storage device to which to move the selected VM such that the selected combined predicted metric is predicted to improve subsequent to the selected VM being moved;
- present a recommendation associated with moving the selected VM from the first storage device to the second storage device; and
- update a recommendation history in response to whether the recommendation is user selected to be implemented.

10. The system of claim 7, wherein to use the selected combined predicted metric to select the VM to move off the first storage device comprises to:
- receive the selected combined predicted metric;
- determine a plurality of available VMs associated with the plurality of storage devices; and
- search for a set of VMs, including the selected VM, wherein a removal of the set of VMs from one or more source storage devices associated with the set of VMs is predicted to improve the selected combined predicted metric.

11. The system of claim 1, wherein to combine the plurality of storage device specific predicted metric data structures corresponding to respective ones of the plurality of storage devices into the combined predicted metric data structure comprises to determine a joint probability based at least in part on predicted metrics associated with each metric type included across the plurality of storage device specific predicted metric data structures.

12. A method, comprising:
- determining a plurality of storage device specific predicted metric data structures corresponding to respective ones of a plurality of storage devices, wherein the plurality of storage device specific predicted metric data structures includes a first storage device specific predicted metric data structure corresponding to a first storage device and a second storage device specific predicted metric data structure corresponding to a second storage device, wherein the first storage device specific predicted metric data structure includes a first predicted metric corresponding to a metric type and the second storage device specific predicted metric data structure includes a second predicted metric corresponding to the metric type, wherein the metric type comprises a specified event;
- combining the plurality of storage device specific predicted metric data structures corresponding to respective ones of the plurality of storage devices into a combined predicted metric data structure, wherein to combine the plurality of storage device specific predicted metric data structures comprises to determine a combined predicted metric corresponding to the metric type based at least in part on combining the first predicted metric and the second predicted metric, wherein the combined predicted metric corresponding to the metric type corresponds to a predicted probability that the specified event associated with the metric type will occur with respect to any storage device within the plurality of storage devices; and
- using the combined predicted metric data structure to determine a virtual machine (VM) to move from the first storage device included in the plurality of storage devices to the second storage device included in the plurality of storage devices to potentially improve at least a portion of the combined predicted metric data structure.

13. The method of claim 12, further comprising:
- determining for the first storage device a plurality of predicted metrics corresponding to respective ones of a plurality of metric types based at least in part on aggregated effective historical VM data stored at the first storage device; and
- including the plurality of predicted metrics into the first storage device specific predicted metric data structure corresponding to the first storage device.

14. The method of claim 13, further comprising:
- determining the aggregated effective historical VM data stored at the first storage device based at least in part on adding to aggregated historical VM data storage at the first storage device historical data associated with an added VM from a source storage device associated with the added VM.

15. The method of claim 13, further comprising:
- determining the aggregated effective historical VM data stored at the first storage device based at least in part on subtracting historical data associated with a removed VM from aggregated historical VM data storage at the first storage device.

16. The method of claim 12, further comprising selecting a combined predicted metric to improve from the combined predicted metric data structure.

17. The method of claim 16, wherein the combined predicted metric data structure includes a plurality of combined predicted metrics and further comprising:
- comparing each of at least a subset of the plurality of combined predicted metrics with a corresponding metric type threshold value; and
- selecting the combined predicted metric included in the combined predicted metric data structure that is to be improved based at least in part on the comparison.

18. The method of claim 16, further comprising:
- using the selected combined predicted metric to select the VM to move off the first storage device;
- determining the second storage device as a destination storage device to which to move the selected VM such that the selected combined predicted metric is predicted to improve subsequent to the selected VM being moved;
- presenting a recommendation associated with moving the selected VM from the first storage device to the second storage device; and
- updating a recommendation history in response to whether the recommendation is user selected to be implemented.

19. The method of claim 16, wherein using the selected combined predicted metric to select the VM to move off the first storage device comprises:
- receiving the selected combined predicted metric;
- determining a plurality of available VMs associated with the plurality of storage devices; and
- searching for a set of VMs, including the selected VM, wherein a removal of the set of VMs from one or more source storage devices associated with the set of VMs is predicted to improve the selected combined predicted metric.

20. A computer program product, the computer program product being embodied in a non-transitory computer readable storage medium and comprising computer instructions for:

determining a plurality of storage device specific predicted metric data structures corresponding to respective ones of a plurality of storage devices, wherein the plurality of storage device specific predicted metric data structures includes a first storage device specific predicted metric data structure corresponding to a first storage device and a second storage device specific predicted metric data structure corresponding to a second storage device, wherein the first storage device specific predicted metric data structure includes a first predicted metric corresponding to a metric type and the second storage device specific predicted metric data structure includes a second predicted metric corresponding to the metric type, wherein the metric type comprises a specified event;

combining the plurality of storage device specific predicted metric data structures corresponding to respective ones of the plurality of storage devices into a combined predicted metric data structure, wherein to combine the plurality of storage device specific predicted metric data structures comprises to determine a combined predicted metric corresponding to the metric type based at least in part on combining the first predicted metric and the second predicted metric, wherein the combined predicted metric corresponding to the metric type corresponds to a predicted probability that the specified event associated with the metric type will occur with respect to any storage device within the plurality of storage devices; and using the combined predicted metric data structure to determine a virtual machine (VM) to move from the first storage device included in the plurality of storage devices to the second storage device included in the plurality of storage devices to potentially improve at least a portion of the combined predicted metric data structure.

* * * * *

UNITED STATES PATENT AND TRADEMARK OFFICE
CERTIFICATE OF CORRECTION

PATENT NO. : 10,564,998 B1
APPLICATION NO. : 15/693244
DATED : February 18, 2020
INVENTOR(S) : Mark G. Gritter, Satya Vempati and Siva Popuri Page 1 of 1

It is certified that error appears in the above-identified patent and that said Letters Patent is hereby corrected as shown below:

On the Title Page

Item [71], delete "Mountain View" and insert --Santa Clara--, therefor.

In the Specification

Column 22, Line(s) 30, delete "110" and insert --I/O--, therefor.

Column 22, Line(s) 34, delete "110" and insert --I/O--, therefor.

Column 23, Line(s) 41, delete "1-c" and insert --1-$\varepsilon$--, therefor.

Column 23, Line(s) 41, after "where", delete "c" and insert --$\varepsilon$--, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*